(12) United States Patent
Blewett et al.

(10) Patent No.: US 7,131,141 B1
(45) Date of Patent: Oct. 31, 2006

(54) METHOD AND APPARATUS FOR SECURELY CONNECTING A PLURALITY OF TRUST-GROUP NETWORKS, A PROTECTED RESOURCE NETWORK AND AN UNTRUSTED NETWORK

(75) Inventors: Charles Douglas Blewett, Madison, NJ (US); John Stewart Denker, Leonardo, NJ (US); Robert J. Hall, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 659 days.

(21) Appl. No.: 09/991,842

(22) Filed: Nov. 19, 2001

Related U.S. Application Data

(60) Provisional application No. 60/308,308, filed on Jul. 27, 2001.

(51) Int. Cl.
*G06F 15/16* (2006.01)
*G06F 17/00* (2006.01)
*G06F 9/00* (2006.01)
*G06F 15/173* (2006.01)

(52) U.S. Cl. .................. 726/12; 726/13; 726/15; 713/153; 713/154; 709/229; 709/223

(58) Field of Classification Search .............. 726/2, 726/12–13, 15, 3; 709/229, 223; 713/201, 713/200, 153, 150
See application file for complete search history.

(56) References Cited

U.S. PATENT DOCUMENTS

| | | | | |
|---|---|---|---|---|
| 5,828,846 A | * | 10/1998 | Kirby et al. ............... | 709/238 |
| 5,968,176 A | * | 10/1999 | Nessett et al. ............. | 713/201 |
| 6,154,839 A | * | 11/2000 | Arrow et al. .............. | 713/154 |
| 6,170,012 B1 | * | 1/2001 | Coss et al. ................. | 709/229 |
| 6,182,226 B1 | * | 1/2001 | Reid et al. ................. | 713/201 |
| 6,212,635 B1 | * | 4/2001 | Reardon .................... | 713/165 |
| 6,321,337 B1 | * | 11/2001 | Reshef et al. ............. | 713/201 |
| 6,453,419 B1 | * | 9/2002 | Flint et al. ................. | 713/201 |
| 6,493,752 B1 | * | 12/2002 | Lee et al. .................. | 709/223 |
| 6,611,875 B1 | * | 8/2003 | Chopra et al. ............. | 709/245 |
| 6,701,437 B1 | * | 3/2004 | Hoke et al. ................ | 713/201 |
| 6,823,462 B1 | * | 11/2004 | Cheng et al. .............. | 713/201 |
| 2002/0010866 A1 | * | 1/2002 | McCullough et al. ..... | 713/201 |

OTHER PUBLICATIONS

J. S. Denker et al., "Moat: A Virtual Private Network Appliance And Services Platform," Proceedings of LISA '99: 13th Systems Administrative Conference, Seattle, Washington, USA, Nov. 7-12, 1999.
Steven M. Bellovin, "Distributed Firewalls," ;login: pp. 37-39, (Nov. 1999).
WatchGuard Designing Peace Of Mind. 1996-2001 WatchGuard Technologies, Inc., 13 pages, www.watchguard.com.

* cited by examiner

*Primary Examiner*—Gilberto Barrón
*Assistant Examiner*—Samson Lemma

(57) ABSTRACT

A security gateway provides a secure connection among one or more networks and a protected resource network. One of the local networks may be connected to the remote private network via a VPN IPsec tunnel. The networks may be local networks that share resources without compromising the security of the protected resource network. The local networks may have access to an untrusted network such as the Internet, sharing a single connection through the security gateway. Dynamic source network address translation is used to permit access from the network connected to the protected resource network to other, less trusted networks while concealing the actual IP addresses of hosts within that network.

17 Claims, 33 Drawing Sheets

FIG. 1C worknet/homenet
Chain PREROUTING (policy DROP 0 packets, 0 bytes)

| pkts | bytes | target | prot | opt | in | out | source | destination | |
|---|---|---|---|---|---|---|---|---|---|
| 0 | 0 | DROP | tcp | -- | eth0 | * | 0.0.0.0/0 | 0.0.0.0/0 | tcp dpt : 25 |
| 0 | 0 | DROP | tcp | -- | ipsec0 | * | 0.0.0.0/0 | 135.207.12.201 | tcp dpt : 25 |
| 0 | 0 | DROP | tcp | -- | eth0 | * | 0.0.0.0/0 | 0.0.0.0/0 | tcp dpt : 53 |
| 0 | 0 | DROP | tcp | -- | ipsec0 | * | 0.0.0.0/0 | 135.207.12.201 | tcp dpt : 53 |
| 0 | 0 | DROP | tcp | -- | eth0 | * | 0.0.0.0/0 | 0.0.0.0/0 | tcp dpt : 6010 |
| 0 | 0 | DROP | tcp | -- | ipsec0 | * | 0.0.0.0/0 | 135.207.12.201 | tcp dpt : 6010 |
| 0 | 0 | DROP | udp | -- | eth0 | * | 0.0.0.0/0 | 0.0.0.0/0 | udp dpt : 53 |
| 0 | 0 | DROP | udp | -- | ipsec0 | * | 0.0.0.0/0 | 135.207.12.201 | udp dpt : 53 |
| 0 | 0 | DROP | udp | -- | eth0 | * | 0.0.0.0/0 | 0.0.0.0/0 | udp dpt : 1025 |
| 0 | 0 | DROP | udp | -- | ipsec0 | * | 0.0.0.0/0 | 135.207.12.201 | udp dpt : 1025 |
| 0 | 0 | ACCEPT | all | -- | lo | * | 0.0.0.0/0 | 0.0.0.0/0 | |
| 0 | 0 | DROP | all | -- | eth1 | * | !135.207.12.200/29 | 0.0.0.0/0 | |
| 0 | 0 | DROP | all | -- | eth1 | * | 0.0.0.0/0 | 10.128.0.2 | |
| 0 | 0 | ACCEPT | all | -- | eth1 | * | 0.0.0.0/0 | 0.0.0.0/0 | |
| 0 | 0 | DROP | all | -- | eth2 | * | !10.0.0.0/9 | 0.0.0.0/0 | |
| 0 | 0 | DROP | all | -- | eth2 | * | 0.0.0.0/0 | 10.128.0.2 | |
| 0 | 0 | ACCEPT | all | -- | eth2 | * | 0.0.0.0/0 | 135.207.12.200/29 | |
| 0 | 0 | ACCEPT | all | -- | ipsec0 | * | 0.0.0.0/0 | 0.0.0.0/0 | |
| 0 | 0 | DROP | all | -- | ipsec0 | * | 135.0.0.0/8 | 135.207.12.200/29 | |
| 0 | 0 | DROP | all | -- | eth0 | * | 0.0.0.0/0 | 0.0.0.0/0 | |
| 0 | 0 | ACCEPT | all | -- | eth0 | * | 0.0.0.0/0 | !10.128.0.2 | |
| 0 | 0 | DROP | all | -- | * | * | 0.0.0.0/0 | 0.0.0.0/0 | |

FIG. 1D
180 worknet/homenet

---- Routing rules:

181 {
- 0:        from all lookup local
- 500:    from all iif eth1 lookup from.work.ifc
- 500:    from all iif lo lookup from.this.host
- 32766:    from all lookup main
- 32767:    from all lookup default ---- Main routing table (main) :

182 {
- 135.207.12.200/29 dev eth1   scope link   src 135.207.12.201
- 10.128.0.0/24 dev eth0   scope link
- 10.0.0.0/9 dev eth2   scope link   src 10.0.0.1
- 127.0.0.0/8 dev lo   scope link
- default via 10.128.0.1 dev eth0   src 10.128.0.2

---- Routing for packets from work_ifc to tunnel ( from.work.ifc ) :

183 {
- blackhole 135.207.12.200/29
- 135.0.0.0/8 dev ipsec0   scope link

---- Routing for packets from localhost to tunnel ( from.this.host ) :

184 {
- 135.207.12.200/29 dev eth1   scope link   src 135.207.12.201
- 135.0.0.0/8 dev ispec0   scope link   src 135.207.12.201

FIG. 1E

190 worknet/homenet

Chain PREROUTING (policy ACCEPT 0 packets, 0 bytes)

| | pkts | bytes | target | prot | opt | in | out | source | destination | |
|---|---|---|---|---|---|---|---|---|---|---|
| 191 | 0 | 0 | SNAT | all | -- | * | eth0 | 0.0.0.0/0 | 0.0.0.0/0 | to:10.128.0.2 |
| 192 | 0 | 0 | SNAT | all | -- | * | eth2 | 0.0.0.0/0 | 0.0.0.0/0 | to:10.0.0.1 |

FIG. 2C
260 homenet/web-server (without worknet)

Chain PREROUTING (policy DROP 0 packets, 0 bytes)

| pkts | bytes | target | prot | opt | in | out | source | destination | |
|---|---|---|---|---|---|---|---|---|---|
| 0 | 0 | DROP | tcp | -- | eth0 | * | 0.0.0.0/0 | 0.0.0.0/0 | tcp dpt : 25 |
| 0 | 0 | DROP | tcp | -- | eth0 | * | 0.0.0.0/0 | 0.0.0.0/0 | tcp dpt : 53 |
| 0 | 0 | DROP | tcp | -- | eth0 | * | 0.0.0.0/0 | 0.0.0.0/0 | tcp dpt : 6010 |
| 0 | 0 | DROP | udp | -- | eth0 | * | 0.0.0.0/0 | 0.0.0.0/0 | udp dpt : 53 |
| 0 | 0 | DROP | udp | -- | eth0 | * | 0.0.0.0/0 | 0.0.0.0/0 | udp dpt : 1025 |
| 0 | 0 | ACCEPT | all | -- | lo | * | 0.0.0.0/0 | 0.0.0.0/0 | |
| 0 | 0 | DROP | all | -- | eth2 | * | !10.0.0.0/9 | 0.0.0.0/0 | |
| 0 | 0 | DROP | all | -- | eth2 | * | 0.0.0.0/0 | 10.128.0.2 | |
| 0 | 0 | ACCEPT | all | -- | eth2 | * | 0.0.0.0/0 | 0.0.0.0/0 | |
| 0 | 0 | DROP | all | -- | eth0 | * | 0.0.0.0/0 | !10.128.0.2 | |
| 0 | 0 | DNAT | tcp | -- | eth0 | * | 0.0.0.0/0 | 0.0.0.0/0 | tcp dpt : 8080 to:10.0.0.7:80 |
| 0 | 0 | ACCEPT | all | -- | eth0 | * | 0.0.0.0/0 | 0.0.0.0/0 | |
| 0 | 0 | DROP | all | -- | * | * | 0.0.0.0/0 | 0.0.0.0/0 | |

270: first five DROP rows
271: ACCEPT lo row
272: eth2 rows
273: to:10.0.0.7:80
274: final ACCEPT/DROP rows

FIG. 2D
280 homenet/web-server (without worknet)

---- Routing rules:
281 { 
0:       from all lookup local
32766:   from all lookup main
32767:   from all lookup default
}
---- Main routing table (main) :
282 {
10.128.0.0/24 dev eth0   scope link
10.0.0.0/9 dev eth2   scope link src 10.0.0.1
127.0.0.0/8 dev lo   scope link
default via 10.128.0.1 dev eth0   src 10.128.0.2
}

FIG. 2E
290 homenet/web-server (without worknet)

Chain POSTROUTING (policy ACCEPT 0 packets, 0 bytes)

| | pkts | bytes | target | prot | opt | in | out | source | destination | |
|---|---|---|---|---|---|---|---|---|---|---|
| 291 | 0 | 0 | SNAT | all | -- | * | eth0 | 0.0.0.0/0 | 0.0.0.0/0 | to:10.128.0.2 |
| 292 | 0 | 0 | SNAT | all | -- | * | eth2 | 0.0.0.0/0 | 0.0.0.0/0 | to:10.0.0.1 |

FIG. 3C
360 worknet plus web server
Chain PREROUTING (policy DROP 0 packets, 0 bytes)

| pkts | bytes | target | prot | opt | in | out | source | destination | |
|---|---|---|---|---|---|---|---|---|---|
| 0 | 0 | DROP | tcp | -- | eth0 | * | 0.0.0.0/0 | 0.0.0.0/0 | tcp dpt : 25 |
| 0 | 0 | DROP | tcp | -- | ipsec0 | * | 0.0.0.0/0 | 135.207.12.201 | tcp dpt : 25 |
| 0 | 0 | DROP | tcp | -- | eth0 | * | 0.0.0.0/0 | 0.0.0.0/0 | tcp dpt : 53 |
| 0 | 0 | DROP | tcp | -- | ipsec0 | * | 0.0.0.0/0 | 135.207.12.201 | tcp dpt : 53 |
| 0 | 0 | DROP | tcp | -- | eth0 | * | 0.0.0.0/0 | 0.0.0.0/0 | tcp dpt : 6010 |
| 0 | 0 | DROP | tcp | -- | ipsec0 | * | 0.0.0.0/0 | 135.207.12.201 | tcp dpt : 6010 |
| 0 | 0 | DROP | udp | -- | eth0 | * | 0.0.0.0/0 | 0.0.0.0/0 | udp dpt : 53 |
| 0 | 0 | DROP | udp | -- | ipsec0 | * | 0.0.0.0/0 | 135.207.12.201 | udp dpt : 53 |
| 0 | 0 | DROP | udp | -- | eth0 | * | 0.0.0.0/0 | 0.0.0.0/0 | udp dpt : 1025 |
| 0 | 0 | DROP | udp | -- | ipsec0 | * | 0.0.0.0/0 | 135.207.12.201 | udp dpt : 1025 |
| 0 | 0 | ACCEPT | all | -- | lo | * | 0.0.0.0/0 | 0.0.0.0/0 | |
| 0 | 0 | DROP | all | -- | eth1 | * | !135.207.12.200/29 | 0.0.0.0/0 | |
| 0 | 0 | DROP | all | -- | eth1 | * | 0.0.0.0/0 | 10.128.0.2 | |
| 0 | 0 | ACCEPT | all | -- | eth1 | * | 0.0.0.0/0 | 0.0.0.0/0 | |
| 0 | 0 | ACCEPT | all | -- | ipsec0 | * | 135.0.0.0/8 | 135.207.12.200/29 | |
| 0 | 0 | DROP | all | -- | ipsec0 | * | 0.0.0.0/0 | 0.0.0.0/0 | |
| 0 | 0 | DNAT | tcp | -- | eth0 | * | 0.0.0.0/0 | !10.128.0.2 | tcp dpt : 8080 |
| to:135.207.12.204:80 | | | | | | | | | |
| 0 | 0 | ACCEPT | all | -- | eth0 | * | 0.0.0.0/0 | 0.0.0.0/0 | |
| 0 | 0 | DROP | all | -- | * | * | 0.0.0.0/0 | 0.0.0.0/0 | |

370: rows 1–10
371: row 11
372: rows 12–14
373: rows 15–16
374: row 17
375: rows 18–19

FIG. 3D
380 worknet plus web server

```
            ---- Routing rules:
       ⎧ 0:      from all lookup local
       ⎪ 500:    from all iif eth1 lookup from.work.ifc
  381 ⎨ 500:    from all iif lo lookup from.this.host
       ⎪ 32766:   from all lookup main
       ⎩ 32767:   from all lookup default
            ---- Main routing table (main) :
       ⎧ 135.207.12.200/29 dev eth1  scope link  src 135.207.12.201
  382 ⎨ 10.128.0.0/24 dev eth0  scope link
       ⎪ 127.0.0.0/8 dev lo  scope link
       ⎩ default via 10.128.0.1 dev eth0  src 10.128.0.2
            ---- Routing for packets from work_ifc to tunnel ( from.work.ifc ) :
  383 ⎧ blackhole 135.207.12.200/29
       ⎩ 135.0.0.0/8 dev ipsec0  scope link
            ---- Routing for packets from localhost to tunnel ( from.this.host ) :
  384 ⎧ 135.207.12.200/29 dev eth1  scope link  src 135.207.12.201
       ⎩ 135.0.0.0/8 dev ispec0  scope link  src 135.207.12.201
```

FIG. 3E
390 worknet plus web server

Chain POSTROUTING (policy ACCEPT 0 packets, 0 bytes)

| pkts | bytes | target | prot | opt | in | out | source | destination | |
|------|-------|--------|------|-----|----|----|--------|-------------|---|
| 391—0 | 0 | SNAT | all | -- | * | eth0 | 0.0.0.0/0 | 0.0.0.0/0 | to:10.128.0.2 |

FIG. 4C
460 worknet/homenet/web-server
Chain PREROUTING (policy DROP 0 packets, 0 bytes)

| pkts | bytes | target | prot | opt | in | out | source | destination | |
|---|---|---|---|---|---|---|---|---|---|
| 0 | 0 | DROP | tcp | -- | eth0 | * | 0.0.0.0/0 | 0.0.0.0/0 | tcp dpt : 25 |
| 0 | 0 | DROP | tcp | -- | ipsec0 | * | 0.0.0.0/0 | 135.207.12.201 | tcp dpt : 25 |
| 0 | 0 | DROP | tcp | -- | eth0 | * | 0.0.0.0/0 | 0.0.0.0/0 | tcp dpt : 53 |
| 0 | 0 | DROP | tcp | -- | ipsec0 | * | 0.0.0.0/0 | 135.207.12.201 | tcp dpt : 53 |
| 0 | 0 | DROP | tcp | -- | eth0 | * | 0.0.0.0/0 | 0.0.0.0/0 | tcp dpt : 6010 |
| 0 | 0 | DROP | tcp | -- | ipsec0 | * | 0.0.0.0/0 | 135.207.12.201 | tcp dpt : 6010 |
| 0 | 0 | DROP | udp | -- | eth0 | * | 0.0.0.0/0 | 0.0.0.0/0 | udp dpt : 53 |
| 0 | 0 | DROP | udp | -- | ipsec0 | * | 0.0.0.0/0 | 135.207.12.201 | udp dpt : 53 |
| 0 | 0 | DROP | udp | -- | eth0 | * | 0.0.0.0/0 | 0.0.0.0/0 | udp dpt : 1025 |
| 0 | 0 | DROP | udp | -- | ipsec0 | * | 0.0.0.0/0 | 135.207.12.201 | udp dpt : 1025 |
| 0 | 0 | ACCEPT | all | -- | lo | * | 0.0.0.0/0 | 0.0.0.0/0 | |
| 0 | 0 | DROP | all | -- | eth1 | * | !135.207.12.200/29 | 0.0.0.0/0 | |
| 0 | 0 | ACCEPT | all | -- | eth1 | * | 0.0.0.0/0 | 0.0.0.0/0 | |
| 0 | 0 | ACCEPT | all | -- | eth2 | * | !10.0.0.0/9 | 10.128.0.2 | |
| 0 | 0 | DROP | all | -- | eth2 | * | 0.0.0.0/0 | 0.0.0.0/0 | |
| 0 | 0 | ACCEPT | all | -- | eth2 | * | 0.0.0.0/0 | 10.128.0.2 | |
| 0 | 0 | ACCEPT | all | -- | ipsec0 | * | 135.0.0.0/8 | 135.207.12.200/29 | |
| 0 | 0 | ACCEPT | all | -- | ipsec0 | * | 0.0.0.0/0 | 135.207.12.200/29 | |
| 0 | 0 | DROP | all | -- | eth0 | * | 0.0.0.0/0 | 0.0.0.0/0 | |
| 0 | 0 | DNAT | tcp | -- | eth0 | * | 0.0.0.0/0 | !10.128.0.2 | tcp dpt : 8080 |
| | | to:10.0.0.07:80 | | | | | | | |
| 0 | 0 | ACCEPT | all | -- | eth0 | * | 0.0.0.0/0 | 0.0.0.0/0 | |
| 0 | 0 | DROP | all | -- | * | * | 0.0.0.0/0 | 0.0.0.0/0 | |

470 (rows 1-10), 471, 472, 473, 474, 475, 476

FIG. 4D
480 worknet/homenet/web-server

---- Routing rules:
0:      from all lookup local
500:    from all iif eth1 lookup from.work.ifc
500:    from all iif lo lookup from.this.host
32766:     from all lookup main
32767:     from all lookup default
---- Main routing table (main) :
135.207.12.200/29 dev eth1   scope link   src 135.207.12.201
10.128.0.0/24 dev eth0   scope link
10.0.0.0/9 dev eth2   scope.link   src 10.0.0.1
127.0.0.0/8 dev lo   scope link
default via 10.128.0.1 dev eth0   src 10.128.0.2
---- Routing for packets from work_ifc to tunnel ( from.work.ifc ) :
blackhole 135.207.12.200/29
135.0.0.0/8 dev ipsec0   scope link
---- Routing for packets from localhost to tunnel ( from.this.host ) :
135.207.12.200/29 dev eth1   scope link   src 135.207.12.201
135.0.0.0/8 dev ispec0   scope link   src 135.207.12.201

FIG. 4E
490 worknet/homenet/web-server

Chain POSTROUTING (policy ACCEPT 0 packets, 0 bytes)

| pkts | bytes | target | prot | opt | in | out | source | destination | |
|---|---|---|---|---|---|---|---|---|---|
| 0 | 0 | SNAT | all | -- | * | eth0 | 0.0.0.0/0 | 0.0.0.0/0 | to:10.128.0.2 |
| 0 | 0 | SNAT | all | -- | * | eth2 | 0.0.0.0/0 | 0.0.0.0/0 | to:10.0.0.1 |

FIG. 5C
560 worknet/consultant without homenet
Chain PREROUTING (policy DROP 0 packets, 0 bytes)

| pkts | bytes | target | prot | opt | in | out | source | destination | |
|---|---|---|---|---|---|---|---|---|---|
| 0 | 0 | DROP | tcp | -- | eth0 | * | 0.0.0.0/0 | 0.0.0.0/0 | tcp dpt : 25 |
| 0 | 0 | DROP | tcp | -- | ipsec0 | * | 0.0.0.0/0 | 135.207.12.201 | tcp dpt : 25 |
| 0 | 0 | DROP | tcp | -- | eth0 | * | 0.0.0.0/0 | 0.0.0.0/0 | tcp dpt : 53 |
| 0 | 0 | DROP | tcp | -- | ipsec0 | * | 0.0.0.0/0 | 135.207.12.201 | tcp dpt : 53 |
| 0 | 0 | DROP | tcp | -- | eth0 | * | 0.0.0.0/0 | 0.0.0.0/0 | tcp dpt : 6010 |
| 0 | 0 | DROP | tcp | -- | ipsec0 | * | 0.0.0.0/0 | 135.207.12.201 | tcp dpt : 6010 |
| 0 | 0 | DROP | udp | -- | eth0 | * | 0.0.0.0/0 | 0.0.0.0/0 | udp dpt : 53 |
| 0 | 0 | DROP | udp | -- | ipsec0 | * | 0.0.0.0/0 | 135.207.12.201 | udp dpt : 53 |
| 0 | 0 | DROP | udp | -- | eth0 | * | 0.0.0.0/0 | 0.0.0.0/0 | udp dpt : 1025 |
| 0 | 0 | DROP | udp | -- | ipsec0 | * | 0.0.0.0/0 | 135.207.12.201 | udp dpt : 1025 |
| 0 | 0 | ACCEPT | all | -- | lo | * | 0.0.0.0/0 | 0.0.0.0/0 | |
| 0 | 0 | DROP | all | -- | eth1 | * | !135.207.12.200/29 | 0.0.0.0/0 | |
| 0 | 0 | ACCEPT | all | -- | eth1 | * | 0.0.0.0/0 | 10.128.0.2 | |
| 0 | 0 | DNAT | all | -- | eth1 | * | 0.0.0.0/0 | 0.0.0.0/0 | |
| 0 | 0 | DNAT | all | -- | ipsec0 | * | 136.0.0.0/8 | 136.0.0.203 | to:135.207.12.203 |
| 0 | 0 | ACCEPT | all | -- | ipsec0 | * | 136.0.0.0/8 | 136.0.0.201 | to:135.207.12.201 |
| 0 | 0 | DROP | all | -- | ipsec0 | * | 135.0.0.0/8 | 135.207.12.200/29 | |
| 0 | 0 | DROP | all | -- | eth0 | * | 0.0.0.0/0 | 0.0.0.0/0 | |
| 0 | 0 | ACCEPT | all | -- | eth0 | * | 0.0.0.0/0 | !10.128.0.2 | |
| 0 | 0 | DROP | all | -- | * | * | 0.0.0.0/0 | 0.0.0.0/0 | |

570 (rows 1–10), 571, 572 (rows 12–13), 573, 574, 575

FIG. 5D
580 worknet/consultant without homenet

```
---- Routing rules:
      ⎛ 0:      from all lookup local
      ⎜ 500:    from all iif eth1 lookup from.work.ifc
581 ⎨ 500:    from all iif lo lookup from.this.host
      ⎜ 32766:  from all lookup main
      ⎝ 32767:  from all lookup default
---- Main routing table (main) :
      ⎛ 135.207.12.200/29 dev eth1   scope link   src 135.207.12.201
582 ⎨ 10.128.0.0/24 dev eth0   scope link
      ⎜ 127.0.0.0/8 dev lo   scope link
      ⎝ default via 10.128.0.1 dev eth0   src 10.128.0.2
---- Routing for packets from work_ifc to tunnel ( from.work.ifc ) :
      ⎛ 136.0.0.0/8 dev ipsec0   scope link
583 ⎨ blackhole 135.207.12.200/29
      ⎝ 135.0.0.0/8 dev ipsec0   scope link
---- Routing for packets from localhost to tunnel ( from.this.host ) :
      ⎛ 136.0.0.0/8 dev ipsec0   scope link   src 135.207.12.201
584 ⎨ 135.207.12.200/29 dev eth1   scope link   src 135.207.12.201
      ⎝ 135.0.0.0/8 dev ipsec0   scope link   src 135.207.12.201
```

FIG. 5E
590 worknet/consultant without homenet

Chain POSTROUTING (policy ACCEPT 0 packets, 0 bytes)

| | pkts | bytes | target | prot | opt | in | out | source | destination | |
|---|---|---|---|---|---|---|---|---|---|---|
| 591 | 0 | 0 | SNAT | all | -- | * | eth0 | 0.0.0.0/0 | 0.0.0.0/0 | to:10.128.0.2 |
| 592 | 0 | 0 | SNAT | all | -- | * | * | 135.207.12.203 | 136.0.0.0/8 | to:136.0.0.203 |
| 593 | 0 | 0 | SNAT | all | -- | * | * | 135.207.12.201 | 136.0.0.0/8 | to:136.0.0.201 |

FIG. 6C
660 worknet/homenet/consultant
Chain PREROUTING (policy DROP 0 packets, 0 bytes)

| pkts | bytes | target | prot | opt | in | out | source | destination | |
|---|---|---|---|---|---|---|---|---|---|
| 0 | 0 | DROP | tcp | -- | eth0 | * | 0.0.0.0/0 | 0.0.0.0/0 | tcp dpt : 25 |
| 0 | 0 | DROP | tcp | -- | ipsec0 | * | 0.0.0.0/0 | 135.207.12.201 | tcp dpt : 25 |
| 0 | 0 | DROP | tcp | -- | eth0 | * | 0.0.0.0/0 | 0.0.0.0/0 | tcp dpt : 53 |
| 0 | 0 | DROP | tcp | -- | ipsec0 | * | 0.0.0.0/0 | 135.207.12.201 | tcp dpt : 53 |
| 0 | 0 | DROP | tcp | -- | eth0 | * | 0.0.0.0/0 | 0.0.0.0/0 | tcp dpt : 6010 |
| 0 | 0 | DROP | tcp | -- | ipsec0 | * | 0.0.0.0/0 | 135.207.12.201 | tcp dpt : 6010 |
| 0 | 0 | DROP | udp | -- | eth0 | * | 0.0.0.0/0 | 0.0.0.0/0 | udp dpt : 53 |
| 0 | 0 | DROP | udp | -- | ipsec0 | * | 0.0.0.0/0 | 135.207.12.201 | udp dpt : 53 |
| 0 | 0 | DROP | udp | -- | eth0 | * | 0.0.0.0/0 | 0.0.0.0/0 | udp dpt : 1025 |
| 0 | 0 | DROP | udp | -- | ipsec0 | * | 0.0.0.0/0 | 135.207.12.201 | udp dpt : 1025 |
| 0 | 0 | ACCEPT | all | -- | lo | * | 0.0.0.0/0 | 0.0.0.0/0 | |
| 0 | 0 | DROP | all | -- | eth1 | * | !135.207.12.200/29 | 0.0.0.0/0 | |
| 0 | 0 | DROP | all | -- | eth1 | * | 0.0.0.0/0 | 10.128.0.2 | |
| 0 | 0 | ACCEPT | all | -- | eth1 | * | 0.0.0.0/0 | 0.0.0.0/0 | |
| 0 | 0 | DROP | all | -- | eth2 | * | !10.0.0.0/9 | 0.0.0.0/0 | |
| 0 | 0 | DROP | all | -- | eth2 | * | 0.0.0.0/0 | 10.128.0.2 | |
| 0 | 0 | DROP | all | -- | eth2 | * | 0.0.0.0/0 | 135.207.12.200/29 | |
| 0 | 0 | ACCEPT | all | -- | eth2 | * | 0.0.0.0/0 | 136.0.0.203 | |
| 0 | 0 | ACCEPT | all | -- | eth2 | * | 0.0.0.0/0 | 136.0.0.201 | |
| 0 | 0 | DNAT | all | -- | ipsec0 | * | 136.0.0.0/8 | 136.0.0.203 | to:235.207.12.203 |
| 0 | 0 | DNAT | all | -- | ipsec0 | * | 136.0.0.0/8 | 136.0.0.201 | to:135.207.12.201 |
| 0 | 0 | ACCEPT | all | -- | ipsec0 | * | 135.0.0.0/8 | 135.207.12.200/29 | |
| 0 | 0 | DROP | all | -- | ipsec0 | * | 0.0.0.0/0 | 0.0.0.0/0 | |
| 0 | 0 | DROP | all | -- | eth0 | * | 0.0.0.0/0 | !10.128.0.2 | |
| 0 | 0 | ACCEPT | all | -- | eth0 | * | 0.0.0.0/0 | 0.0.0.0/0 | |
| 0 | 0 | DROP | all | -- | * | * | 0.0.0.0/0 | 0.0.0.0/0 | |

670, 671, 672, 673, 674, 675, 676

FIG. 6D
680 worknet/homenet consultant

```
---- Routing rules:
      ⎛ 0:      from all lookup local
      ⎜ 500:    from all iif eth1 lookup from.work.ifc
681 ⎨ 500:    from all iif lo lookup from.this.host
      ⎜ 32766:  from all lookup main
      ⎝ 32767:  from all lookup default
---- Main routing table (main) :
      ⎛ 135.207.12.200/29 dev eth1  scope link  src 135.207.12.201
      ⎜ 10.128.0.0/24 dev eth0  scope link
682 ⎨ 10.0.0.0/9 dev eth0  scope link
      ⎜ 127.0.0.0/8 dev lo  scope link
      ⎝ default via 10.128.0.1 dev eth0  src 10.128.0.2
---- Routing for packets from work_ifc to tunnel ( from.work.ifc ) :
      ⎛ 136.0.0.0/8 dev ipsec0  scope link
683 ⎨ blackhole 135.207.12.200/29
      ⎝ 135.0.0.0/8 dev ipsec0  scope link
---- Routing for packets from localhost to tunnel ( from.this.host ) :
      ⎛ 136.0.0.0/8 dev ipsec0  scope link  src 135.207.12.201
684 ⎨ 135.207.12.200/29 dev eth1  scope link  src 135.207.12.201
      ⎝ 135.0.0.0/8 dev ipsec0  scope link  src 135.207.12.201
```

FIG. 6E
690 worknet/homenet/consultant

Chain POSTROUTING (policy ACCEPT 0 packets, 0 bytes)

| | pkts | bytes | target | prot | opt | in | out | source | destination | |
|---|---|---|---|---|---|---|---|---|---|---|
| 691 | 0 | 0 | SNAT | all | -- | * | eth0 | 0.0.0.0/0 | 0.0.0.0/0 | to:10.128.0.2 |
| 692 | 0 | 0 | SNAT | all | -- | * | eth2 | 0.0.0.0/0 | 0.0.0.0/0 | to:10.0.0.1 |
| 693 | 0 | 0 | SNAT | all | -- | * | * | 135.207.12.203 | 136.0.0.0/8 | to:136.0.0.203 |
| 694 | 0 | 0 | SNAT | all | -- | * | * | 135.207.12.201 | 136.0.0.0/8 | to:136.0.0.201 |

FIG. 7C
760 worknet/homenet/web-server/consult

Chain PREROUTING (policy DROP 0 packets, 0 bytes)

| pkts | bytes | target | prot | opt | in | out | source | destination | |
|---|---|---|---|---|---|---|---|---|---|
| 0 | 0 | DROP | tcp | -- | eth0 | * | 0.0.0.0/0 | 0.0.0.0/0 | tcp dpt : 25 |
| 0 | 0 | DROP | tcp | -- | ipsec0 | * | 0.0.0.0/0 | 135.207.12.201 | tcp dpt : 25 |
| 0 | 0 | DROP | tcp | -- | eth0 | * | 0.0.0.0/0 | 0.0.0.0/0 | tcp dpt : 53 |
| 0 | 0 | DROP | tcp | -- | ipsec0 | * | 0.0.0.0/0 | 135.207.12.201 | tcp dpt : 53 |
| 0 | 0 | DROP | tcp | -- | eth0 | * | 0.0.0.0/0 | 0.0.0.0/0 | tcp dpt : 6010 |
| 0 | 0 | DROP | tcp | -- | ipsec0 | * | 0.0.0.0/0 | 135.207.12.201 | tcp dpt : 6010 |
| 0 | 0 | DROP | udp | -- | eth0 | * | 0.0.0.0/0 | 0.0.0.0/0 | udp dpt : 53 |
| 0 | 0 | DROP | udp | -- | ipsec0 | * | 0.0.0.0/0 | 135.207.12.201 | udp dpt : 53 |
| 0 | 0 | DROP | udp | -- | eth0 | * | 0.0.0.0/0 | 0.0.0.0/0 | udp dpt : 1025 |
| 0 | 0 | DROP | udp | -- | ipsec0 | * | 0.0.0.0/0 | 135.207.12.201 | udp dpt : 1025 |
| 0 | 0 | ACCEPT | all | -- | lo | * | 0.0.0.0/0 | 0.0.0.0/0 | |
| 0 | 0 | DROP | all | -- | eth1 | * | !135.207.12.200/29 | 0.0.0.0/0 | |
| 0 | 0 | DROP | all | -- | eth1 | * | 0.0.0.0/0 | 10.128.0.2 | |
| 0 | 0 | ACCEPT | all | -- | eth1 | * | 0.0.0.0/0 | 0.0.0.0/0 | |

770 (rows 1–10), 771 (row 11), 772 (rows 12–13)

FIG. 7C CONT

| | | | | | | |
|---|---|---|---|---|---|---|
| 0 | 0 | DROP | all | -- | eth2 | * | !10.0.0.0/9 | 0.0.0.0/0 |
| 0 | 0 | DROP | all | -- | eth2 | * | 0.0.0.0/0 | 10.128.0.2 |
| 773 { 0 | 0 | DROP | all | -- | eth2 | * | 0.0.0.0/0 | 135.207.12.200/29 |
| 0 | 0 | DROP | all | -- | eth2 | * | 0.0.0.0/0 | 136.0.0.203 |
| 0 | 0 | DROP | all | -- | eth2 | * | 0.0.0.0/0 | 136.0.0.201 |
| 0 | 0 | ACCEPT | all | -- | eth2 | * | 0.0.0.0/0 | 0.0.0.0/0 |
| 0 | 0 | DNAT | all | -- | ipsec0 | * | 136.0.0.0/8 | 136.0.0.203    to:235.207.12.203 |
| 774 { 0 | 0 | DNAT | all | -- | ipsec0 | * | 136.0.0.0/8 | 136.0.0.201    to:135.207.12.201 |
| 0 | 0 | ACCEPT | all | -- | ipsec0 | * | 135.0.0.0/8 | 135.207.12.200/29 |
| 0 | 0 | DROP | all | -- | eth0 | * | 0.0.0.0/0 | 0.0.0.0/0 |
| 775 { 0 | 0 | DNAT | tcp | -- | eth0 | * | 0.0.0.0/0 | !10.128.0.2 |
| to:10.0.0.7:80 | | | | | | | | |
| 0 | 0 | ACCEPT | all | -- | eth0 | * | 0.0.0.0/0 | 0.0.0.0/0 |
| 776 ~ 0 | 0 | DROP | all | -- | * | * | 0.0.0.0/0 | 0.0.0.0/0 |

FIG. 7D
780 worknet/homenet/web-server/consult

---- Routing rules:
781 {
0:       from all lookup local
500:     from all iif eth1 lookup from.work.ifc
500:     from all iif lo lookup from.this.host
32766:   from all lookup main
32767:   from all lookup default
}
---- Main routing table (main) :
782 {
135.207.12.200/29 dev eth1   scope link   src 135.207.12.201
10.128.0.0/24 dev eth0   scope link
10.0.0.0/9 dev eth0   scope link   src 10.0.0.1
127.0.0.0/8 dev lo   scope link
default via 10.128.0.1 dev eth0   src 10.128.0.2
}
---- Routing for packets from work_ifc to tunnel ( from.work.ifc ) :
783 {
136.0.0.0/8 dev ipsec0   scope link
blackhole 135.207.12.200/29
135.0.0.0/8 dev ipsec0   scope link
}
---- Routing for packets from localhost to tunnel ( from.this.host ) :
784 {
136.0.0.0/8 dev ipsec0   scope link   src 135.207.12.201
135.207.12.200/29 dev eth1   scope link   src 135.207.12.201
135.0.0.0/8 dev ipsec0   scope link   src 135.207.12.201
}

FIG. 7E
790 worknet/homenet/web-server/consult

Chain POSTROUTING (policy ACCEPT 0 packets, 0 bytes)

| | pkts | bytes | target | prot | opt | in | out | source | destination | |
|---|---|---|---|---|---|---|---|---|---|---|
| 791 | 0 | 0 | SNAT | all | -- | * | eth0 | 0.0.0.0/0 | 0.0.0.0/0 | to:10.128.0.2 |
| 792 | 0 | 0 | SNAT | all | -- | * | eth2 | 0.0.0.0/0 | 0.0.0.0/0 | to:10.0.0.1 |
| 793 | 0 | 0 | SNAT | all | -- | * | * | 135.207.12.203 | 136.0.0.0/8 | to:136.0.0.203 |
| 794 | 0 | 0 | SNAT | all | -- | * | * | 135.207.12.201 | 136.0.0.0/8 | to:136.0.0.201 |

METHOD AND APPARATUS FOR SECURELY CONNECTING A PLURALITY OF TRUST-GROUP NETWORKS, A PROTECTED RESOURCE NETWORK AND AN UNTRUSTED NETWORK

CROSS REFERENCE TO RELATED APPLICATIONS

This application claims priority to Provisional Application Ser. No. 60/308,308, entitled "WORK/HOME MOAT CONFIGURATION," filed on Jul. 27, 2001, the content of which is incorporated by reference herein. Three related applications are filed on even date herewith: METHOD AND APPARATUS FOR SECURELY CONNECTING EACH OF A PLURALITY OF LOCAL NETWORKS TO A CORRESPONDING SECURE REMOTE NETWORK AND TO AN UNTRUSTED REMOTE NETWORK; METHOD AND APPARATUS FOR SECURELY CONNECTING A LOCAL NETWORK WITH TWO OR MORE SECURE REMOTE NETWORKS AND AN UNTRUSTED REMOTE NETWORK; and METHOD AND APPARATUS FOR CONNECTING A SECURE REMOTE NETWORK, AN UNTRUSTED REMOTE NETWORK AND LOCAL NETWORKS THAT INCLUDE A NETWORK SERVER.

FIELD OF THE INVENTION

The present invention relates generally to secure network access among a plurality of networks with differing security requirements, and more particularly, to a security gateway for connecting trusted home networks, a secure corporate network and an untrusted network such as the Internet.

BACKGROUND OF THE INVENTION

As consumers, small businesses, and telecommuting employees expand the use of high-speed networking connections (such as DSL service or cable-TV based data service) in their homes and offices, networked computers become inviting targets to network intruders. Typically, those computers are connected to a public network all or most of the time, yet are not maintained by professional administrators. There is therefore a need to provide secure and reliable, yet flexible and usable network security to such consumers.

One system directed to solving this problem is the first-generation Moat, a security gateway developed within AT&T Corporation primarily for providing a secure connection between a home network and a secure remote corporate network. See J. Denker, S. Bellovin, H. Daniel, N. Mintz, T. Killian & M. Plotnik; Moat: A Virtual Private Network Appliance and Services Platform; Proc. LISA '99: 13$^{th}$ Systems Administration Conference, USENIX Assoc. 1999, the contents of which is hereby incorporated by reference in this disclosure.

The term "remote network," as used herein, denotes a network that is accessed from a given location through a communications link such as the public switched telephone network or the open Internet. Conversely, a network that is "local" to a given location may be reached from that location without using a communications link. For example, a network reachable from a given location using Ethernet or another LAN technology is a local network at that location. The term "network" is used herein shall encompass connecting hardware such as cables routers and interfaces, as well as the connected hosts.

The first generation Moat utilizes a secure, IPsec-based VPN (virtual private network) tunnel to transmit data between the home network and the corporate network. The VPN tunnel provides a strong cryptographic, secure, private, and authenticated connection into a remote network, such as a corporate (firewall protected) network. See S. Kent & R. Atkinson, Security Architecture for the Internet Protocol, Request for Comments (Proposed Standard) 2401, Internet Engineering Task Force, November 1999, the contents of which is hereby incorporated by reference in this disclosure. In the case of Moat, the VPN tunnel gives some (or all) machines behind the Moat security gateway IP-level access to the resources on the corporate network, while all traffic between the corporate network and the home machines is encrypted and authenticated so it cannot be snooped or otherwise tampered with. The first generation Moat system, however, provides for only a single network on its protected side. Furthermore, all packets traveling into and out of the protected network traverse the tunnel and the corporate network, adding significant delay to simple Internet requests, and making those Internet requests dependent on the functioning of the corporate network. While this is arguably a simple configuration from a security standpoint, users demand more flexibility and efficiency.

Advanced packet routing capabilities have become available as part of the Linux operating system. Those capabilities allow flexible packet routing and network address and port translation. Source network address translation (SNAT) (or IP masquerading) refers to dynamically replacing the source address and/or port of packets with another IP address and/or port, as part of the routing process. Destination network address translation (DNAT) refers to dynamically replacing the destination address and/or port of packets with another IP address and/or port, also as part of the routing process.

In both cases (SNAT and DNAT), the Linux kernel automatically reverses the translation for reply packets. For example, a rule may be established to translate the source address (SNAT) of a client request bound for host A on the open Internet. Reply packets received from host A will contain a destination address that is the translated source address of the client request. That destination address will automatically be translated to the actual address of the client.

In addition to Moat, several other security products exist for providing a connection between a home machine and a secure corporate network. For example, Watchguard Corporation of Seattle, Wash. markets a Firebox® line (see http://www.watchguard.com/products/firebox.asp) that provides for a single home network connected to the Internet and to a secure corporate network through a VPN tunnel. Network address translation is used to hide the internal IP addresses from the external network and to allow internal hosts with unregistered IP addresses to function as Internet-reachable servers. No capability is provided for a separate home network.

There is therefore a need for a security gateway for the home or small business that can utilize a VPN IP tunnel to provide a secure connection from a work network of machines used for business purposes to a secure corporate network, while allowing that work network to share resources with a home network in a secure manner. The work network desirably also shares the same Internet connection with the home network without having access to the corporate network and without compromising the security of the corporate network. The work network may furthermore require access to two or more corporate networks without allowing access between the corporate networks. In homes where both spouses occasionally telecommute to different companies, there is a similar need to guarantee that there is no network connectivity between the two corporate networks introduced by a VPN solution. Where individuals or small businesses wish to host their own web sites or to host their email locally, there is furthermore a need to provide a secure and limited connection from the open Internet to a host residing behind the security gateway.

SUMMARY OF THE INVENTION

A technical advance is made over the prior art through the system and method of the present invention. The present invention provides a security gateway that may function as firewall, router, VPN tunnel endpoint, and general service platform. Security is enhanced because the hosts in the networks "behind" the security gateway are not directly connected to an untrusted network such as the open Internet via an Internet service provider (ISP), or such as an intranet containing a wireless LAN. Traffic is then routed through the security gateway from its sources and to its destinations, with the security gateway acting as the bulwark against untrusted-network-based attacks.

A first embodiment of the invention features a security gateway for securely connecting a plurality of networks. The security gateway has a logical interface to a first network, a logical interface to a second network, a physical interface to an untrusted network and a logical interface to a protected resource network. A protected resource network, as used herein, is a network that is protected from unauthorized access by one or more firewalls or other security measures. The network contains resources that may be accessed by authorized parties. A logical interface is an interface implemented by a physical and/or by a virtual path connection. A physical interface includes a direct connection (for example, wired, wireless, acoustical, optical, infrared) between the interfaced entities. Common examples of direct connections existing today include dial-up modems, cable modems and DSL modems. An interface between two networks through a third network is a logical interface, but it is not a physical interface.

The gateway furthermore has a processor configured to execute packet handling rules for performing various functions. Those functions include denying at least some client access through the gateway from hosts in the untrusted network to hosts in the first network, in the second network and in the protected resource network. The packet handling rules are also for denying at least some client access through the gateway from hosts in the second network to hosts in the first network. The packet handling rules also permit at least some client access through the gateway from hosts in the first network to hosts in the second network and in the protected resource network.

"Client access" as used herein represents the ability of a client in a first network to initiate an IP connection with a host in a second network. Once such a protocol session, such as a TCP/IP connection, is established, the connection proceeds normally, allowing packets in both directions until it is terminated by either host. Client access through a gateway shall mean client access in which the packets initiating the session travel through the gateway. "Some" client access shall mean the ability of the host in the first network to initiate at least one such session.

The processor of the security gateway may further be configured to execute packet handling rules for translating a source network address in a packet sent to the second network. In that case, the source address may be translated to be the network address of the security gateway interface to the second network.

The packet handling rules may further permit at least some client access through the gateway from hosts in the first network to hosts in the untrusted network. In this embodiment, the rules may translate a source network address in a packet sent to the untrusted network; that source network address may be translated to be the network address of the security gateway interface to the untrusted network.

The processor is also be configured to execute packet handling rules for permitting at least some client access through the gateway from hosts in the protected resource network to hosts in the first network, or alternatively for denying at least some client access through the gateway from hosts in the protected resource network to hosts in the first network.

The processor may be configured to execute packet handling rules for permitting at least some client access through the gateway from hosts in the second network to hosts in the untrusted network. In that case, the rules may translate a source network address in a packet sent to the untrusted network; that source network address may be translated to be the network address of the security gateway interface to the untrusted network.

The security gateway may further have a protected network service such as a mail relay; in that case, the processor is further configured to execute packet handling rules for denying at least some client access through the gateway from at least one network to the protected network service.

The logical interface to the protected resource network may include a VPN tunnel utilizing the untrusted network.

The processor of the security gateway may further be configured to execute packet handling rules for denying at least some client access through the gateway from hosts in the protected resource network to hosts in the second network, or for denying at least some client access through the gateway from hosts in the protected resource network to hosts in the untrusted network, or for denying at least some client access through the gateway from hosts in the second network to hosts in the protected resource network.

The logical interface to the first network may be a logical interface to a first trust-group network, and the logical interface to the second interface may be a logical interface to a second trust-group network. A "trust-group" as used herein means a group of hosts that are allowed to exchange packets with each other without packet filtering. For example, a group of hosts connected via one or more Ethernet hubs or switches is a trust-group.

The logical interfaces to the first and second networks may be logical interfaces to local networks. The logical interface to the protected resource network may be a logical interface to a remote corporate network.

In another embodiment of the invention, a machine readable medium contains configuration instructions for performing a method for securely connecting a plurality of networks through a security gateway. As above, the gateway has a logical interface to a first network, a logical interface to a second network, a physical interface to an untrusted network and a logical interface to a protected resource network. The method includes the steps of denying at least some client access through the gateway from hosts in the untrusted network to hosts in the first network, in the second network and in the protected resource network; denying at least some client access through the gateway from hosts in the second network to hosts in the first network; and permitting at least some client access through the gateway from hosts in the first network to hosts in the second network and in the protected resource network.

Another embodiment of the invention is a method for securely connecting a plurality of networks through a security gateway as described above. The method includes the steps of denying at least some client access through the gateway from hosts in the untrusted network to hosts in the first network, in the second network and in the protected resource network; denying at least some client access through the gateway from hosts in the second network to hosts in the first network; and permitting at least some client access through the gateway from hosts in the first network to hosts in the second network and in the protected resource network.

These and other advantages of the invention will be apparent to those of ordinary skill in the art by reference to the following detailed description and the accompanying drawings.

BRIEF DESCRIPTION OF THE DRAWINGS

FIG. 1C is a table showing pre-routing rules in an implementation of the embodiment of FIG. 1A;

FIG. 1D is a table showing routing rules in an implementation of the embodiment of FIG. 1A;

FIG. 1E is a table showing post-routing rules in an implementation of the embodiment of FIG. 1A;

FIG. 2C is a table showing pre-routing rules in an implementation of the embodiment of FIG. 2A;

FIG. 2D is a table showing routing rules in an implementation of the embodiment of FIG. 2A;

FIG. 2E is a table showing post-routing rules in an implementation of the embodiment of FIG. 2A;

FIG. 3C is a table showing pre-routing rules in an implementation of the embodiment of FIG. 3A;

FIG. 3D is a table showing routing rules in an implementation of the embodiment of FIG. 3A;

FIG. 3E is a table showing post-routing rules in an implementation of the embodiment of FIG. 3A;

FIG. 4C is a table showing pre-routing rules in an implementation of the embodiment of FIG. 4A;

FIG. 4D is a table showing routing rules in an implementation of the embodiment of FIG. 4A;

FIG. 4E is a table showing post-routing rules in an implementation of the embodiment of FIG. 4A;

FIG. 5C is a table showing pre-routing rules in an implementation of the embodiment of FIG. 5A;

FIG. 5D is a table showing routing rules in an implementation of the embodiment of FIG. 5A;

FIG. 5E is a table showing post-routing rules in an implementation of the embodiment of FIG. 5A;

FIG. 6C is a table showing pre-routing rules in an implementation of the embodiment of FIG. 6A;

FIG. 6D is a table showing routing rules in an implementation of the embodiment of FIG. 6A;

FIG. 6E is a table showing post-routing rules in an implementation of the embodiment of FIG. 6A;

FIG. 7C is a table showing pre-routing rules in an implementation of the embodiment of FIG. 7A;

FIG. 7D is a table showing routing rules in an implementation of the embodiment of FIG. 7A;

FIG. 7E is a table showing post-routing rules in an implementation of the embodiment of FIG. 7A;

DETAILED DESCRIPTION

The security gateway and methods of the present invention are described herein as applied to several network combinations and configurations. Those combinations and configurations are intended to represent situations in which one or more networks in a home have connections to networks outside the home. The exemplary combinations and configurations, however, are applicable to other scenarios in which the trust relationship among the networks is similar to that described.

Figure 1A:
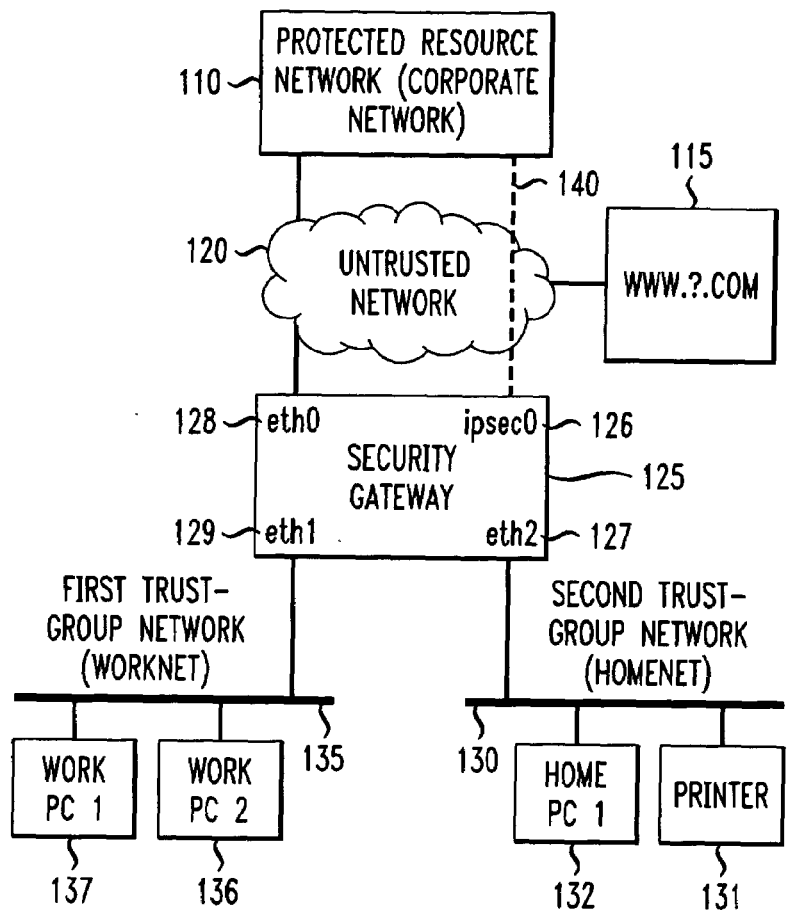
FIG. 1A is a schematic diagram of an embodiment of the invention including a first network and a second network with access to a protected resource network.

A first embodiment of the security gateway, shown schematically in FIG. 1A, is a configuration wherein the security gateway 125 protects two trust-group networks: a first trust-group network or "worknet" 135 and a second trust-group network or "homenet" 130. The worknet and homenet trust-group networks are described below. The security gateway is connected to several additional networks, including an untrusted network 120 such as the Internet, and a protected resource network 110 such as a secure, internal corporate network containing resources such as data and applications, and protected by its own firewall. The embodiment of FIG. 1A is useful in common home computing environment in which some computers within the home (worknet) must securely communicate with a remote corporate network in a telecommuting function, while other home machines (homenet) are for personal use by family members. Certain devices on the family side, such as printers, are also used for work purposes.

"Worknet" as used herein refers to a trust-group network 135 of machines such as personal computers 136, 137 used for work purposes. The worknet trust-group network may reside locally with respect to the security gateway 125. In the illustrated embodiment, worknet 135 is connected to the security gateway 125 via an Ethernet interface 129 (labeled "eth1"). In place of an Ethernet system, another local area network (LAN) technology, such as a token ring network, FDDI (Fiber Distributed Data Interface) or a wireless LAN may be used. In any case, a logical interface between worknet and the security gateway is established, whereby the flow of packets may be controlled.

Worknet may physically be located in an employee's home (as used herein, the term "employee" shall refer to a person authorized to access the protected resource network 110 through the worknet network). Alternatively worknet may be in a remote field office that is connected to a secure network in the home office. In addition to personal computers, printers, plotters, scanners, memory devices or other peripherals (not shown) may be part of the worknet trust-group network.

Worknet 135 is securely connected by the security gateway 125 to the remote private network 110 via an IPsec-based VPN tunnel 140 traversing the untrusted network 120. The VPN tunnel connects to the security gateway through a virtual interface 126 (labeled "ipsec0"). The virtual interface 126 provides a logical interface between the security gateway and the remote private network 110; the connection actually utilizes the physical Ethernet connection 128 (labeled "eth0"); i.e., encrypted data between worknet 135 and the remote private network 110 travels through the physical Ethernet connection 128 to the untrusted network 120.

Worknet 135 is a "trusted" network as seen from the security gateway 125 and from the protected resource network 110. Authorized users of worknet are presumed not to be adversaries. Furthermore, the devices within worknet are presumed not to be corrupted or compromised, because they are under the control of an authorized user.

In addition to worknet, a homenet trust-group network 130 is located behind the security gateway 125. Homenet may be a network within an employee's home containing devices used by the employee for personal use, and/or devices used by members of the employee's household. For example, personal computer 132 on homenet 130 may be a computer within the home used primarily by an employee's family members. Homenet may also contain output devices that an employee may wish to use in conjunction with a computer on the worknet network. For example, an employee may have a home printer 131 on homenet that is used for family purposes, but is also used by the employee in printing documents from a worknet machine. As with worknet, the devices in homenet are connected using any LAN technology. In the illustrated embodiment, the physical connection between the homenet trust-group network and the security gateway is an Ethernet interface 127 (labeled "eth2"). A logical interface between homenet and the security gateway is established using that connection.

The homenet network 130 is not trusted as seen from the protected resource network 110 and worknet 135. Users of homenet may not be authorized to access resources in the protected resource network 110. Furthermore, because the homenet trust-group network 130 may not be actively supervised by a network manager, it is possible that compromised machines may exist on homenet.

In a current implementation of the invention, the security gateway 125 is an inexpensive Intel-architecture personal computer running the GNU/LINUX operating system (www.linux.org), including the LINUX kernel's advanced routing utilities for specifying packet routes and the "iptables" packet filter package for specifying firewall rules. The open-source FreeS/Wan IPsec implementation (www-.freeswan.org) is used for supporting the VPN tunnel 140 connecting the protected resource network 110. In the embodiment of FIG. 1A, the PC has three Ethernet interface cards 127, 128, 129 used for the purposes described above.

In the homenet/worknet configuration of the invention shown in FIG. 1A, the security gateway 125 serves as a firewall protecting both homenet 130 and worknet 135 from an untrusted network 120 such as the open Internet. As best shown in the packet flow diagram of FIG. 1B, at least some packets are permitted to flow through the gateway from homenet 130 and worknet 135 to the untrusted network 120, but the security gateway performs source network address translation (SNAT) on those packets before they are sent. Specifically, source addresses in outgoing packets bound for the untrusted network 120 are translated to the network address of the security gateway 125 from the network address of the real source machine within worknet or homenet. By translating the source network addresses of the packets in that manner, the security gateway 125 conceals the actual network addresses of the machines within the protected networks, discouraging attacks from the untrusted network 120.

Figure 1B:
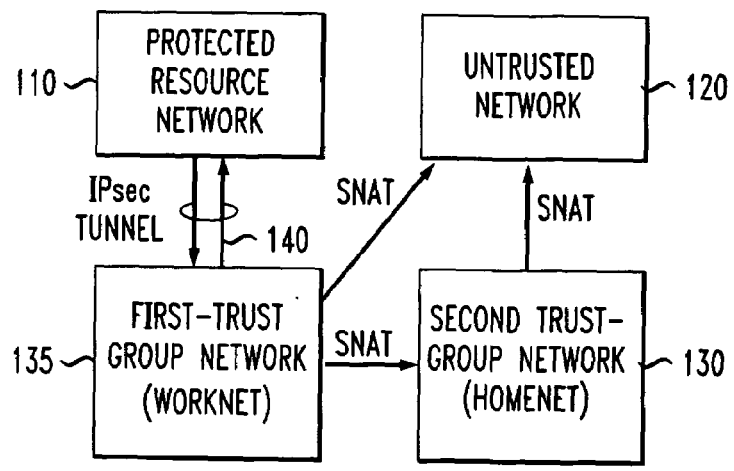
FIG. 1B is a packet flow diagram of the embodiment of FIG. 1A.

The arrows of the packet flow diagram of FIG. 1B show at least some "client access" through the gateway from one network to another. For example, the arrow from worknet 135 to the untrusted network 120 represents the ability of a client in worknet to initiate an IP connection with a host in the untrusted network. Once such a protocol session, such as a TCP/IP connection, is established, the security gateway permits the flow of "reply" packets from the particular host in the untrusted network to the client in worknet. A reply packet received from that host in the untrusted network contains a destination address that is the IP address of the security gateway 125, because the source address of outgoing packets had been translated using SNAT. The security gateway recognizes the packet as a reply packet, automatically translates the destination address and routes the packet to the proper host in worknet.

There is no arrow in the packet flow diagram of FIG. 1B pointing from the untrusted network 120 to worknet 135. That signifies that a client in the untrusted network 120 is not permitted to initiate at least some IP connections with a computer in worknet. By permitting client access from worknet to the untrusted network, but denying (not permitting) client access in the reverse direction, the security gateway permits worknet users to utilize resources in the untrusted network 120 with a greatly reduced security exposure. A similar arrangement permits client access from hosts in homenet 130 to hosts in the untrusted network, but not the reverse.

The single arrow from worknet 135 to homenet 130 signifies that a client in worknet may initiate a client access of a host in homenet, but a client in homenet may not initiate an access with a client in worknet. Moreover, as shown in FIG. 1B, packets flowing from worknet to homenet undergo a SNAT translation of the source address, concealing the real network addresses of hosts in worknet. That packet flow scheme permits hosts in worknet to utilize resources such as printers within homenet without compromising the security of the hosts in worknet.

In the exemplary embodiment, the IPsec tunnel 140 between worknet 135 and the protected resource network 110 provides for secure, encrypted communication between machines within the home or a branch office and hosts within the corporate network. Packet flow for client access is shown to be permitted in both directions through the tunnel. For example, an employee may initiate a connection for accessing data or downloading email; conversely, the corporate network may initiate a connection for installing software on a worknet machine. In an alternative embodiment of the invention (not shown), client access from the protected resource network 110 to worknet is not permitted. That arrangement may be desirable, for example, where personal data reside on worknet machines, or where, because of the size of the protected resource network, there may be security concerns about permitting client access to sensitive company data on worknet machines.

As shown in the packet flow diagram of FIG. 1B, no client access in either direction is permitted between homenet 130 and the protected resource network 110. That policy prevents potentially corrupt hosts or unauthorized users in homenet from accessing hosts in the protected resource network, and also prevents hosts in the protected resource network from accessing potentially sensitive personal data residing on the machines in homenet. Similarly, no client access in either direction is permitted by the security gateway between the protected resource network 110 and the untrusted network 120. That policy prevents potentially adversarial hosts in the untrusted network from accessing hosts in the protected resource network. Additionally, that policy prevents a host in the protected resource network from using the security gateway to access the untrusted network. Permitting such access would otherwise make it difficult for a system manager to monitor or control employee access to the protected resource network. For example, that routing policy prevents an employee's co-worker in the protected resource network from using a security gateway in the employee's home to access Web sites that are otherwise forbidden by company policy or by filters in the company's firewall.

As noted above, to implement the routing rules and policies of the invention, the security gateway utilizes the advanced routing utilities of the LINUX kernel, including the "iptables" packet filter package. FIGS. 1C, 1D and 1E are tables showing the routing rules and policies used in the worknet/homenet embodiment of the invention described above. In the following discussion, selected ones of those rules are explained to illustrate how the above-described security gateway might be implemented. One skilled in the art will recognize that other rule sets may be used to accomplish similar security objectives.

FIG. 1C is a pre-routing table that defines packet handling rules for determining whether a packet arriving on a security gateway logical interface should be accepted or dropped. The term "interface" as used herein in describing the exemplary packet handling rules denotes a logical interface that may be implemented through a physical or a virtual connection, or in another known manner. FIG. 1D is a routing table that defines packet handling rules for routing the packet to the proper interface for output from the security gateway. FIG. 1E is a post-routing table for defining packet handling rules on whether a SNAT translation should be performed on the packet before the packet leaves the security gateway. As used herein, the term "packet handling rules" shall encompass pre-routing rules, routing rules and post-routing rules. In general, packet handling rules include packet filtering rules, routing rules and network address/port translation rules, among others. The various types of packet handling rules are coordinated to implement a desired security gateway functionality.

FIG. 1C shows a pre-routing rule table 160 used by the security gateway in accepting or dropping packets received through one of the four gateway interfaces ipsec0 (VPN tunnel interface to protected resource network), eth0 (open Internet interface), eth1 (worknet interface), and eth2 (homenet interface). Rows in the table represent rules that are evaluated sequentially by the security gateway for each packet until a match is found; the final rule 176 drops all remaining packets.

In the table 160, column 161, labeled "target," contains an instruction as to the disposition of a packet matching the criteria in the rule. "ACCEPT" means that a matching packet will be permitted to enter the gateway; conversely, "DROP" means a matching packet will be rejected. The instructions "DNAT" and "SNAT" in column 161 perform the corresponding network address/port translation operation on a matching packet before accepting it.

The data in column 162 through column 167 define criteria used to determine whether a packet is a matching packet. Column 162, labeled "prot," contains the protocol of a matching packet. Columns 163, 164 show the input and output interfaces, respectively, through which a matching packet arrives or departs. Columns 165, 166, labeled "source" and "destination," respectively, show the source and destination IP addresses contained in a matching packet. Column 167 indicates the TCP source or destination port of a matching packet, where applicable.

The first rows 170 of the table 160 define port screening rules for securing protected network services such as a mail relay within the security gateway. The rules DROP packets from the open Internet interface ("eth0" in column 163) and from the VPN tunnel interface ("IPsec0" in column 163) that are directed to specific ports (column 167) used as mail relays or other network services for homenet or worknet.

Row 171 defines a rule applicable to packets arriving at the security gateway from the local host interface (designated "lo" in the column 163). The rule accepts from that interface packets containing any source address (source=0.0.0.0/0) and any destination address (destination=0.0.0.0/0), permitting packets originating within the security gateway to be cycled back to the security gateway.

The three rows 172 represent three rules applying to packets arriving at the security gateway through the worknet interface (designated "eth1" in column 163). In the first of those rules, the gateway DROPs all packets NOT containing one of the source addresses assigned to worknet (in this case, ! 135.207.12.200/29, the exclamation point (!) meaning NOT)); i.e., all packets accepted from the worknet interface must contain a worknet source address. The second rule DROPs any packet arriving on the worknet interface that contains the open Internet address of the security gateway (10.128.0.2) as its IP destination address. The last of the rows 172 defines a rule that ACCEPTs all other packets arriving at the worknet interface of the security gateway.

The rows 173 represent four rules applying to packets arriving at the security gateway through the homenet interface (designated "eth2" in column 163). The first, second and fourth of those rules perform functions similar to those performed by the first, second and third rules defined in rows 172, except that the rules apply to packets from homenet, not worknet. The third of the rows 173 defines a rule to DROP any packet arriving at the homenet interface of the security gateway and containing a worknet IP address (135.201.12.200/29) as its destination address. In other words, hosts on homenet may not initiate connections to hosts on worknet. Significantly, the worknet rules of rows 172 have no equivalent policy, meaning that hosts on worknet may initiate client access to hosts on homenet. As described above, those rules allow a limited form of sharing; for example, a networked printer on homenet may be used by worknet machines as well as by homenet machines.

The rows 174 represent two rules governing packets arriving at the security gateway through the secure VPN tunnel interface ("ipsec0" in column 163). The VPN tunnel interface is actually a virtual interface for routing purposes; the packets actually travel through the untrusted network. The first rule defined in rows 174 ACCEPTs all packets arriving at the security gateway from the tunnel that contain a source IP address in the protected resource network (135.0.0.0/8) and a destination address in worknet (135.207.12.200/29). The second rule DROPs all other packets arriving at the security gateway through the VPN tunnel interface. That rule set assures that only packets from the protected resource network are accepted from the tunnel, and that only packets bound for worknet are accepted from the tunnel. Information from the protected resource network is thereby not routed to homenet or to the untrusted network. Furthermore, users within the protected resource network cannot access data on homenet machines and cannot access unauthorized Web sites using the employee's security gateway.

The rows 175 define two rules governing packets arriving at the security gateway through the interface to the untrusted network ("eth0" in column 163). The first of those rules DROPs any packet arriving on the untrusted network interface that does not contain the open Internet address of the security gateway (10.128.0.2) as its IP destination address. The second rule ACCEPTs all other packets arriving at the security gateway through the untrusted network interface. Thus, the security gateway will not accept packets from the untrusted network that are addressed directly to hosts on worknet, homenet or the protected resource network. Instead, all communications from the untrusted network to one of those protected networks must be reply packets on a SNATed connection to the security gateway, as described below with reference to FIG. 1E.

Table 180, shown in FIG. 1D, contains routing rules for routing packets that have been accepted by the security gateway under the rules defined in table 160 of FIG. 1C. The table 180 includes a priority list 181 for using the subsequent groups of rules. For example, if a packet arrives at the worknet input interface, represented by "iif eth1" in the second line of priority list 181, then the routing rules 183 (from.work.ifc) are applied. If a packet arrives at the local host interface ("iif lo" in the third line of list 181), routing rules 184 (from.this.host) are applied. Packets not matching rules defined in other tables are routed using the main routing rules 182 (main).

The routing rules themselves determine the interface through which a packet will be sent according to the destination address contained in the packet. For example, the first rule of the "main" routing table 182 states that a packet containing a destination IP address of any host in worknet, i.e., 135.207.12.200/29, will be sent out through the worknet interface eth1. The second rule of table 182 routes any packet containing a destination IP address corresponding to an untrusted network address, i.e., 10.128.0.0/24, to the untrusted network interface eth0. The third rule of table 182 routes any packet containing a destination address in homenet, i.e., 10.0.0.0/9, to the homenet interface eth2.

As noted above, the rules of table 183 route packets received at the worknet interface. If the packet contains a destination address in worknet (135.207.12.200/29), the packet is "blackholed," or discarded, by the security gateway. If the packet contains a destination address in the protected resource network, i.e., 135.0.0.0/8, the packet is sent to the VPN tunnel interface ipsec0. Similarly, packets received from the local host lo are routed according to the rules of table 184.

FIG. 1E illustrates a table 190 containing rules governing the source network address translation (SNAT) performed on packets after routing decisions are made according to the rules shown in FIG. 1D. Row 191 defines a rule in which all packets sent out the untrusted network interface (eth0) are SNATed. The source address of each such packet is translated to the Internet IP address of the security gateway (10.128.0.2 in this example). Thus, any packet sent out to the untrusted network appears to be from the security gateway, shielding the host within worknet or homenet that actually originated the packet.

Row 192 defines a rule in which all packets being sent to homenet (eth2) are SNATed. The source IP address of each of those packets is translated to the security gateway's homenet address, making all packets going to homenet appear to have originated in the security gateway. That rule protects hosts within worknet from compromised hosts in homenet.

Figure 2A:
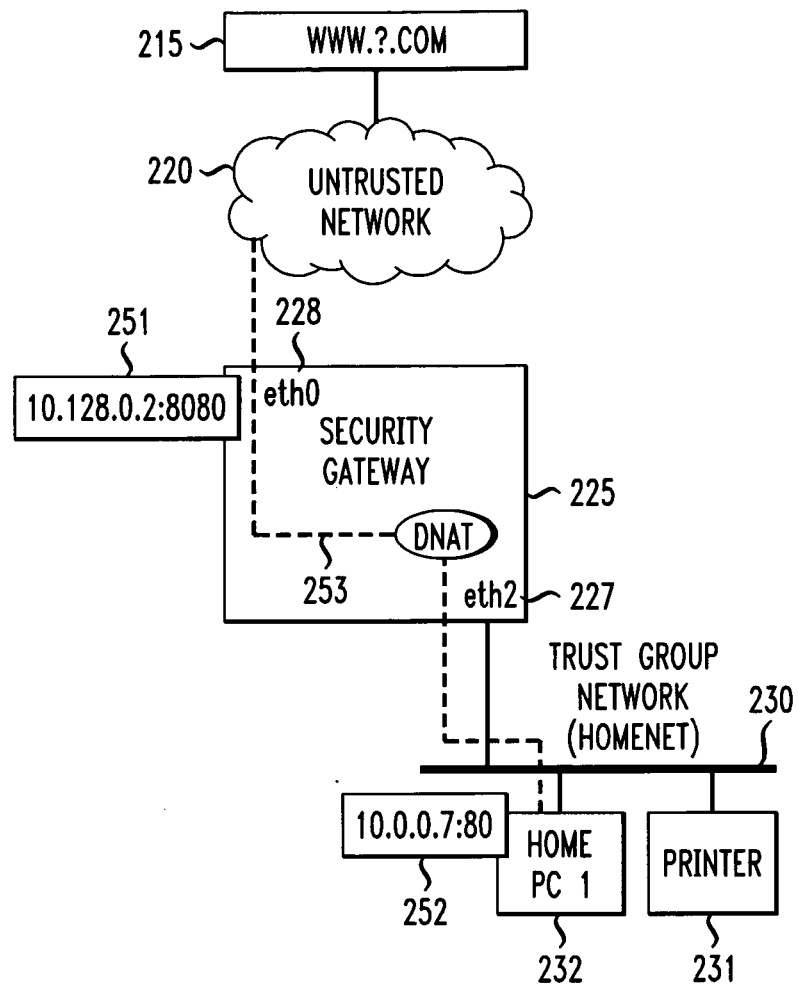
FIG. 2A is a schematic diagram of an embodiment of the invention including a network with an accessible server.

In a second embodiment of the security gateway and method, shown schematically in FIG. 2A, the security gateway 225 protects a trust-group network, homenet 230, and is connected to an untrusted network 220 such as the Internet. One of the machines 232 within homenet functions as a server such as a Web server hosting a Web site or a server providing another protected network service such as an email server, an instant messaging server or a voice-over-IP server, accessible from the untrusted network 220. The server will be referred to herein as an "accessible server."

The security gateway 225 in that embodiment performs a firewall function by protecting the homenet network 230 from adversaries in the untrusted network 220. At the same time, the security gateway permits "limited access" by clients in the untrusted network to the accessible server 232 within homenet. "Limited access," as used herein, means client access wherein the actual destination address is not revealed to the client. To accomplish this, packets arriving from the untrusted network 220 at a fixed network port 251 (10.128.0.2:8080 in the present example) on the security gateway 225 are forwarded using DNAT through path 253 to a particular port 252 (10.0.0.7:80 in this example) on the accessible server 232 within homenet 230. By using Destination NAT, clients in the untrusted network may access the accessible server 232 in homenet without knowing the actual IP address of that server. Instead, packets are addressed to the fixed network port 251 of the security gateway 225, and that destination IP address is translated before forwarding the packets to the accessible server 232. Additionally, by using DNAT, only a single port is exposed to the untrusted network, instead of exposing the entire server 232.

Figure 2B:
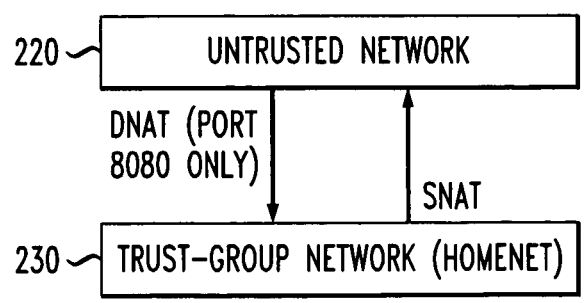
FIG. 2B is a packet flow diagram of the embodiment of FIG. 2A.

As best shown in the packet flow diagram of FIG. 2B, the only packets forwarded from the untrusted network 220 to homenet 230 are either reply packets on a SNATed connection or input on port 8080 of the security gateway. No other packets are accepted from the untrusted network. Using DNAT, the destination IP address of packets addressed to port 8080 of the security gateway is translated to be port 80 on the designated homenet accessible server host.

FIGS. 2C, 2D and 2E show the rules and policies used in the homenet/accessible server embodiment of the invention. FIG. 2C shows a prerouting rule table 260 used by the security gateway in accepting or dropping packets received through one of the two gateway interfaces eth0 (untrusted interface) and eth2 (homenet interface). As in the prerouting table 160 shown in FIG. 1C, each line of the table 260 is a rule for determining what should be done with packets arriving at the interfaces of the security gateway. In addition to the ACCEPT and DROP rules defined in table 160, however, table 260 also contains a rule requiring a DNAT operation to be performed on the packet before it is routed.

As in table 160 of FIG. 1C, the rules of initial rows 270 of table 260 define port screening rules for securing a protected network service such as a mail relay within the security gateway. Rows 271 and 272 define rules for accepting or dropping packets received from homenet (eth2) and the local host (lo), and the rule defined in row 274 drops all packets not matching a previously defined rule. Those rules also perform functions similar to corresponding rules in table 160 of FIG. 1C, discussed above.

Rows 273 contain rules for the disposition of packets received at the untrusted network interface of the security gateway (eth0). Of interest in this discussion is the second of those rules, which performs destination network address translation (DNAT) on those packets received at the untrusted network interface and containing a destination address specifying port 8080. That destination address is translated by the security gateway to port 80 of the host in homenet functioning as an accessible server (10.0.0.7:80 in this example). In that way, hosts on the untrusted network are not given direct access to the accessible server in homenet, but can originate a client access through the DNATed connection to the security gateway interface.

The routing rules, defined in table 280 shown in FIG. 2D, include a rule priority 281 and main routing table 282 similar in function to corresponding elements shown in table 180 of FIG. 1D. Additional routing tables are not necessary because there is no VPN tunnel in the homenet/accessible server embodiment. The post-routing rules of table 290, shown in FIG. 2E, are similar to the post-routing rules of table 190 discussed above with reference to FIG. 1E.

Figure 3A:
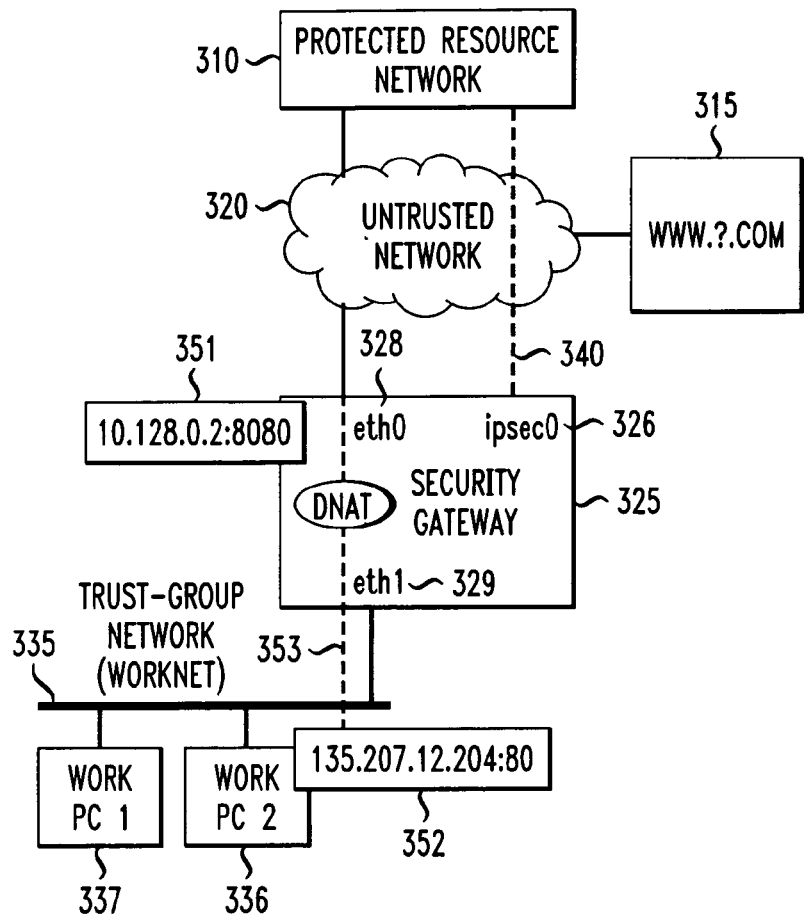
FIG. 3A is a schematic diagram of an embodiment of the invention including a network with an accessible server and with access to a protected resource network.

In the embodiment of the invention shown in FIG. 3A, the security gateway 325 protects a worknet trust-group network 335 of hosts that includes a host 336 functioning as an accessible server. The security gateway 325 also provides connectivity through a secure VPN tunnel 340 to a protected resource network 310. As in the previously illustrated embodiment, DNAT is used to translate destination addresses of inbound packets going to the accessible server.

Figure 3B:
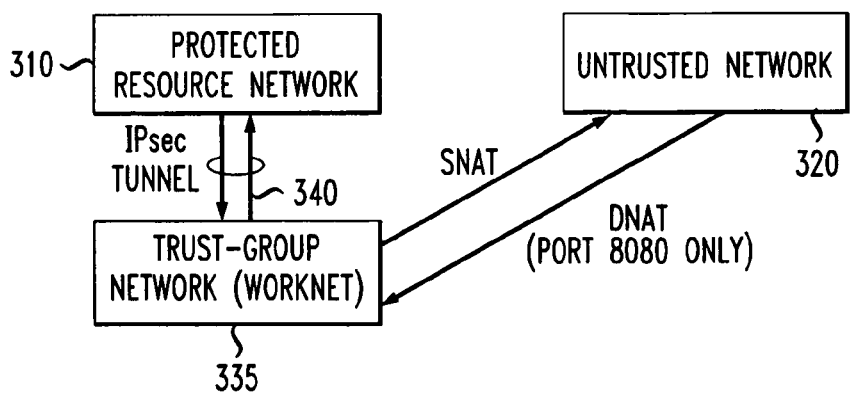
FIG. 3B is a packet flow diagram of the embodiment of FIG. 3A.

A packet flow diagram (FIG. 3B) shows that no packets are permitted to flow between the protected resource network 310 and the untrusted network 320, preventing clients in those networks from using the security gateway to access each other.

FIGS. 3C, 3D and 3E show exemplary rules and policies used in a worknet/accessible server embodiment of the invention. FIG. 3C shows a prerouting rule table 360 used by the security gateway 325 in accepting and dropping packets received through one of the three gateway interfaces eth0, eth1 and ipsec0. As in the above-described prerouting rule tables, rows in the table represent rules that are evaluated sequentially by the security gateway for each packet until a match is found; the final rule 375 drops all remaining packets.

The rules contained in rows 370 define port screening rules, and the rules in rows 371, 372 and 373 define rules for accepting or dropping packets received from worknet (eth1), the VPN tunnel (ipsec0) and the local host (lo). Those rules are similar to corresponding rules in table 160 of FIG. 1C, discussed above.

Rows 374 contain rules for the disposition of packets received at the untrusted network interface of the security gateway (eth0). As in the embodiment of FIG. 2C, the second of those rules performs destination network address translation (DNAT) on those packets received at the untrusted network interface and containing a destination address specifying port 8080 of the security gateway's Internet IP address. In that case, the destination address is translated by the security gateway to port 80 of the host in worknet functioning as an accessible server (135.207.12.204:80 in the example).

The routing rules, defined in table 380 shown in FIG. 3D, include a rule priority 381 and routing tables 382, 383, 384 similar in function to corresponding elements shown in table 180 of FIG. 1D. The post-routing rule of table 390, shown in FIG. 3E, translates source addresses of packets bound for the remote untrusted network, as does rule 191 of table 190 discussed above with reference to FIG. 1E In another embodiment of the invention, shown in FIG. 4A, the security gateway 425 protects two networks, a first trust-group network functioning as a worknet 435 and a second trust-group network functioning as a homenet 430. Worknet 435 is connected via a VPN IPsec tunnel 440 to a protected resource network 410 such as a remote corporate network. A host 432 within homenet 430 functions as an accessible server, and limited client access to the accessible server is permitted from the untrusted network 420. Both homenet and worknet have client access to the untrusted network.

Figure 4A:
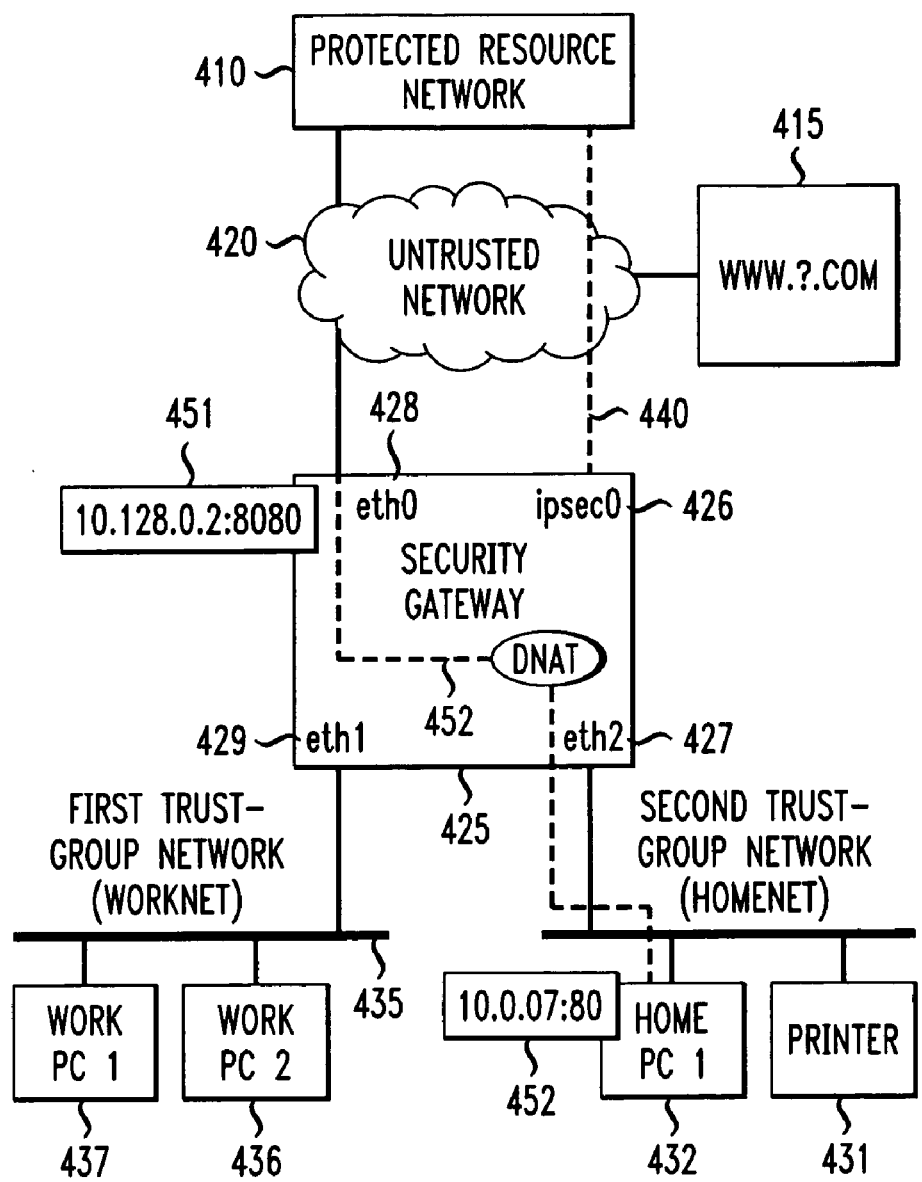
FIG. 4A is a schematic diagram of an embodiment of the invention including a first network with access to a protected resource network and a second network with an accessible server.
Figure 4B:
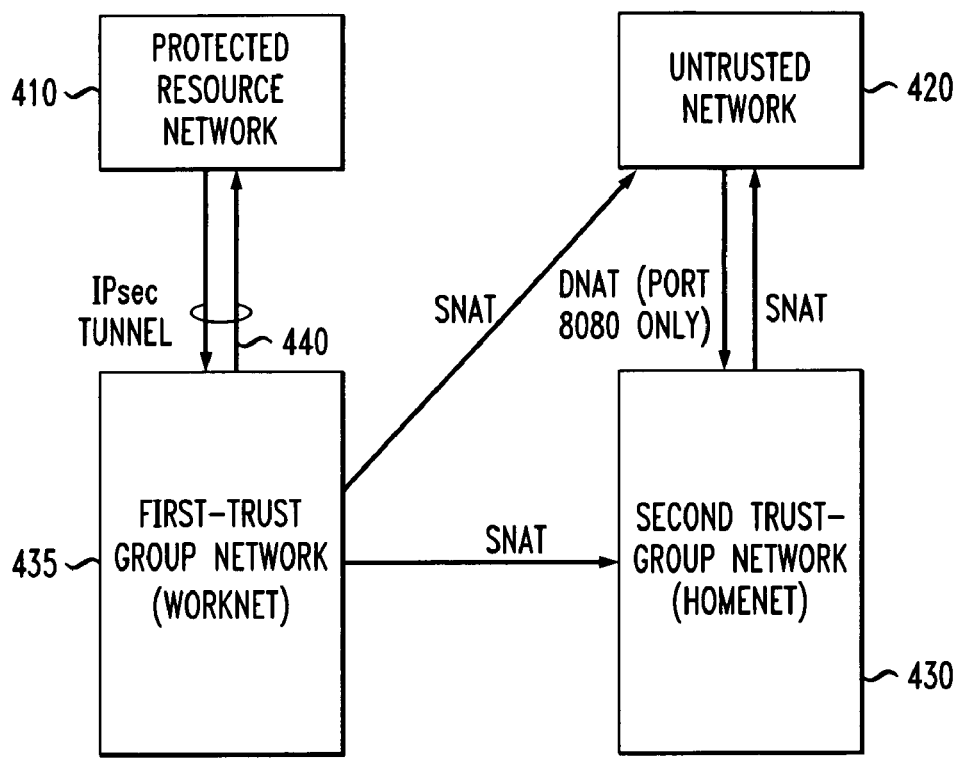
FIG. 4B is a packet flow diagram of the embodiment of FIG. 4A.

A packet flow diagram, shown in FIG. 4B, shows permitted packet flows for the embodiment including worknet and homenet, with an accessible server hosted within homenet. Packet flow is similar to that of the worknet/homenet embodiment shown in FIG. 1B, with the exception that the security gateway permits limited client access from the remote untrusted network to homenet via port 8080 of the security gateway.

FIGS. 4C, 4D and 4E show the rules and policies used in the worknet/homenet/accessible server embodiment of the invention described with reference to FIGS. 4A and 4B. The pre-routing table 460, shown in FIG. 4C, is similar to the table shown in FIG. 1C representing the worknet/homenet routing. The prerouting rules differ in the addition of a single DNAT rule to the rules 475 governing disposition of packets arriving at the untrusted network interface (eth0). As in the homenet/accessible server embodiment (FIG. 2C) and worknet/accessible server embodiment (FIG. 3C), the rule performs destination network address translation (DNAT) on those packets received at the untrusted network interface of the security gateway and containing a destination address specifying port 8080. The routing rule table 480 of FIG. 4D and post-routing rule table 490 of FIG. 4E are similar to those discussed above with reference to FIGS. 1D and 1E, showing the worknet/homenet embodiment of the invention.

Figure 5A:
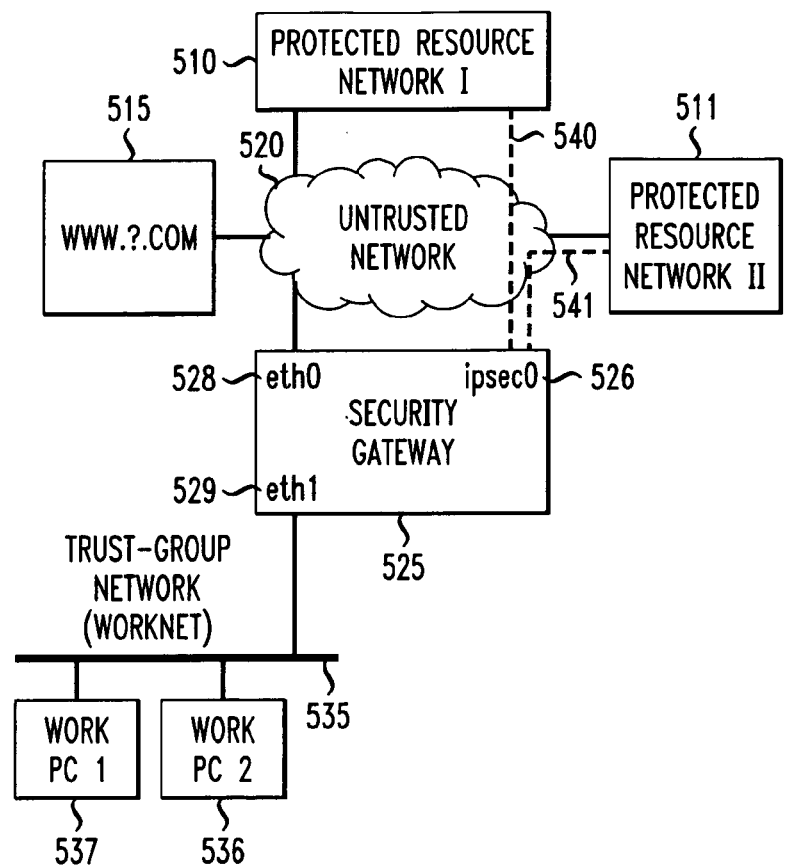
FIG. 5A is a schematic diagram of an embodiment of the invention including a network with access to first and second protected resource networks.

As depicted in FIG. 5A, the security gateway of the present invention may protect a worknet trust-group network 535 that is linked by VPN tunnels 540, 541 to two separate protected resource networks 510, 511. Packets forwarded through the first tunnel 540 to and from protected resource network 1 (510) are forwarded without address translation as described above. Packets forwarded through the second tunnel 541 to and from protected resource network 11 (511) have their source addresses mapped into the address space of the second protected resource network domain during routing. Reply packets have the inverse operation performed. That capability is implemented using a combination of SNAT and DNAT as described below.

The configuration of FIG. 5A may be used, for example, where a consultant must have access both to the consultant's employer's network and to a client's network. In the case where the VPN tunnels traverse the Internet or a similar public network, the consultant need only subscribe to a single connection to that network while maintaining the two logical interfaces to the employer's network and the client's network.

Figure 5B:
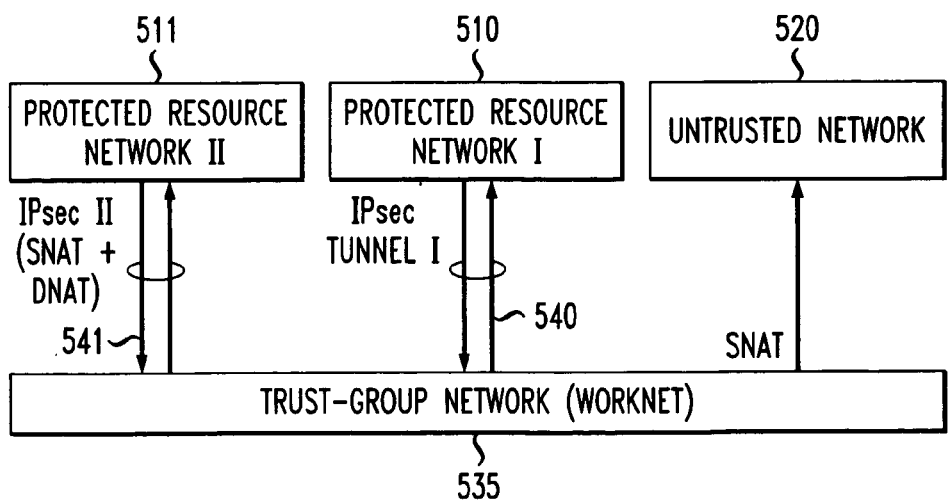
FIG. 5B is a packet flow diagram of the embodiment of FIG. 5A.

As shown in the packet routing diagram of FIG. 5B, the security gateway permits no packets to be exchanged between the two protected resource networks 510, 511. Similarly, no packets are permitted between either of the protected resource networks and the untrusted network 520.

FIGS. 5C, 5D and 5E show the rules and policies used in the embodiment of the invention having two VPN tunnels to two protected resource networks. In that example, the first protected resource network has IP addresses in the domain 135.0.0.0/8 and the second protected resource network has IP addresses in the domain 136.0.0.0/8. One skilled in the art will recognize that those IP addresses, like other IP addresses in this disclosure, are arbitrary, and that alternative IP addresses could be selected. The VPN tunnels linking the protected resource networks are connected to the security gateway through the interface ipsec0.

FIG. 5C shows a pre-routing rule table 560 used by the security gateway in accepting or dropping packets received through the three gateway interfaces eth0, eth 1 and ipsec0. The table is similar to table 160 of FIG. 1C, with the exception that two rules have been added to the rules 573 governing disposition of packets received at the security gateway tunnel interface ipsec0.

In the first of the rules 573, packets containing a source IP address of a host within the second protected resource network and a specific destination address 136.0.0.203 are DNATed to a specific host within worknet 135.207.12.203. Similarly, in the second of the rules 573, packets from the second protected resource network containing the destination address 136.0.0.201 are DNATed to 135.207.12.201. In that way, packets from the second protected resource network addressed to IP addresses designated for receiving such packets are accepted through the tunnel from the second protected resource network. One skilled in the art will recognize that analogous rules could be added if additional machines were designated to receive packets from the second protected resource network.

The DNAT operations on incoming packets from the second protected resource network translate the destination IP address from an address in the domain of the second protected resource network to an IP address in the domain of the first protected resource network. That technique permits an individual host in worknet to receive packets from both protected resource networks while having a single IP address.

The routing rules, defined in table 580 shown in FIG. 5D, include a rule priority 581, a main routing table 582, and routing tables 583, 584 for routing to the VPN tunnel. Those tables have the same function as corresponding elements of table 180 of FIG. 1D. Because homenet is not a part of the presently illustrated embodiment, a rule in the main routing table 182 pertaining to homenet eth2 is not included in main routing table 582.

Rules have been added to each of the tables 583, 584 governing disposition of packets to be sent to the VPN tunnel interface ipsec0. For example, the first rule of table 583 sends all packets from worknet containing a destination address of a host in the second protected resource network 136.0.0.0/8 through the VPN tunnel ipsec0. A similar rule in table 584 routes packets from the local host.

The post-routing rules of table 590, shown in FIG. 5E, handle outbound packets to the second protected resource network. In rules 592, 593 of the table 590, all packets addressed to the second protected resource network 136.0.0.0/8 containing source addresses 135.207.12.203 and 135.207.12.201, which are particular hosts in worknet, are SNATed to addresses 136.0.0.203 and 136.0.0.201, respectively. Those translations make packets sent to the second protected resource network appear to be sent from hosts within the domain of that network. Thus, an individual host in worknet having a single IP address may send packets to both protected resource networks while appearing to be internal to each protected resource network.

Figure 6A:
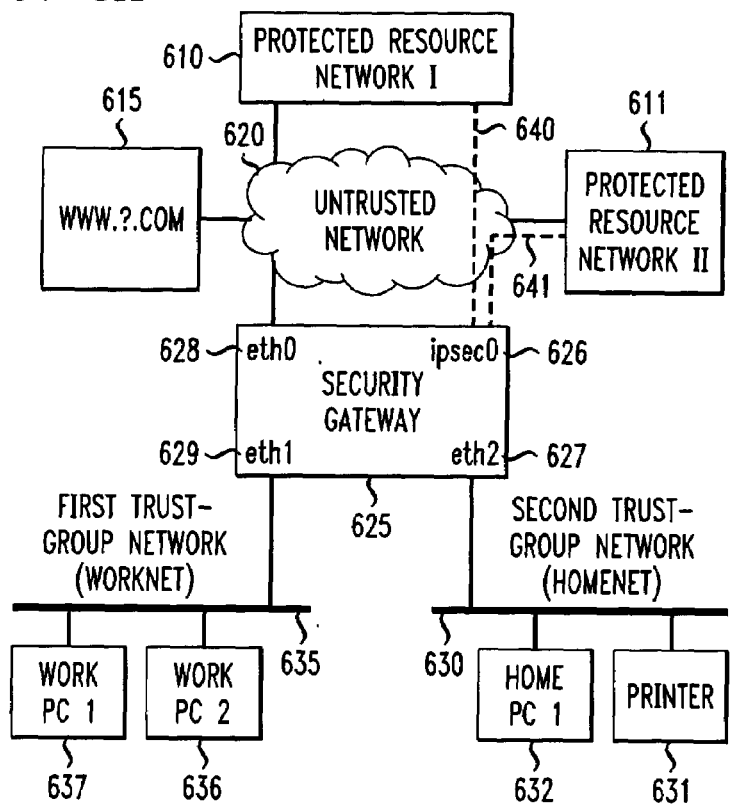
FIG. 6A is a schematic diagram of an embodiment of the invention including a first network and a second network with access to first and second protected resource networks.
Figure 6B:
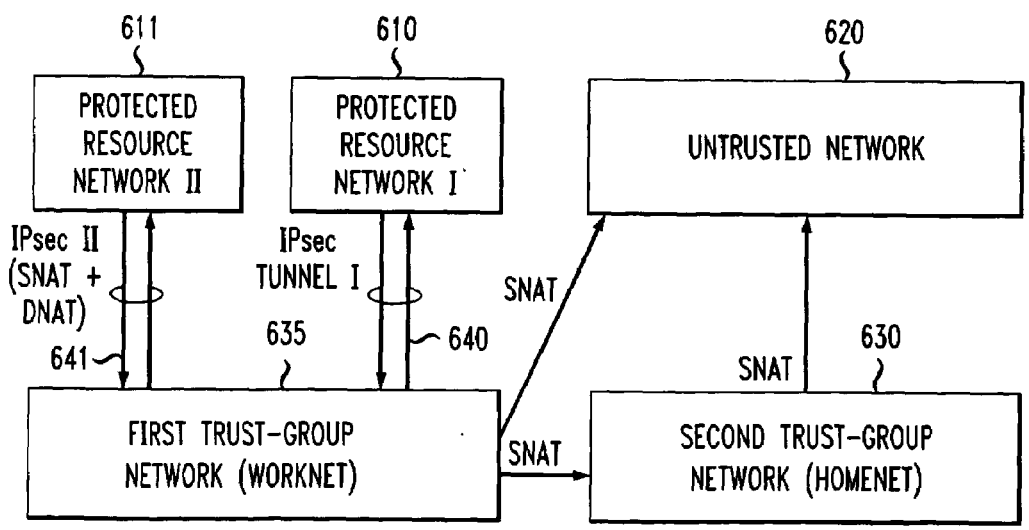
FIG. 6B is a packet flow diagram of the embodiment of FIG. 6A.

In a further embodiment of the invention, shown schematically in FIG. 6A, a homenet trust-group network 630 is added to the embodiment having two VPN tunnels connecting two protected resource networks to the security gateway and a worknet. The worknet network 635 has client access to two protected resource networks 610, 611, while both worknet and homenet have client access to an untrusted network 620. As best shown by the packet routing diagram of FIG. 6B, no packets are transmitted by the security gateway among the first and second protected resource networks 610, 611 and the untrusted network 620. Client access is permitted from worknet to homenet, but not from homenet to worknet.

FIGS. 6C, 6D and 6E show the rules and policies used in the embodiment of the invention having a homenet and a worknet with access to two protected resource networks. The prerouting table 660, shown in FIG. 6C, contains several rules in addition to those contained in the worknet/homenet table 160 shown in FIG. 1C. The rules 673 contain two additional instances where packets from homenet (eth2) are dropped. Those instances are where packets from homenet are addressed to the IP addresses (136.0.0.203 and 136.0.0.201) used for addressing packets traveling between the second protected resource network and the designated hosts in worknet. Those prerouting rules prevent a corrupt host in homenet from initiating a connection with a host in worknet even if the host discovers the address of the target machine in the domain of the second protected resource network.

Additionally, as in the worknet/consultant prerouting rules described with reference to FIG. 5C, two DNAT rules are added to the rules 674 pertaining to packets arriving through the VPN tunnel. Those rules translate destination IP addresses in the domain of the second protected resource network to addresses of hosts in worknet.

In the routing rules 680 for the worknet/homenet/consultant embodiment of the invention, shown in FIG. 6D, an additional rule for packets addressed to the second protected resource network has been added to each of the routing tables 683, 684. In the post-routing rules 690, as in post-routing rules 590 discussed above with reference to FIG. 5E, two additional SNAT rules were added to translate source addresses of packets addressed to the second protected resource network.

Figure 7A:
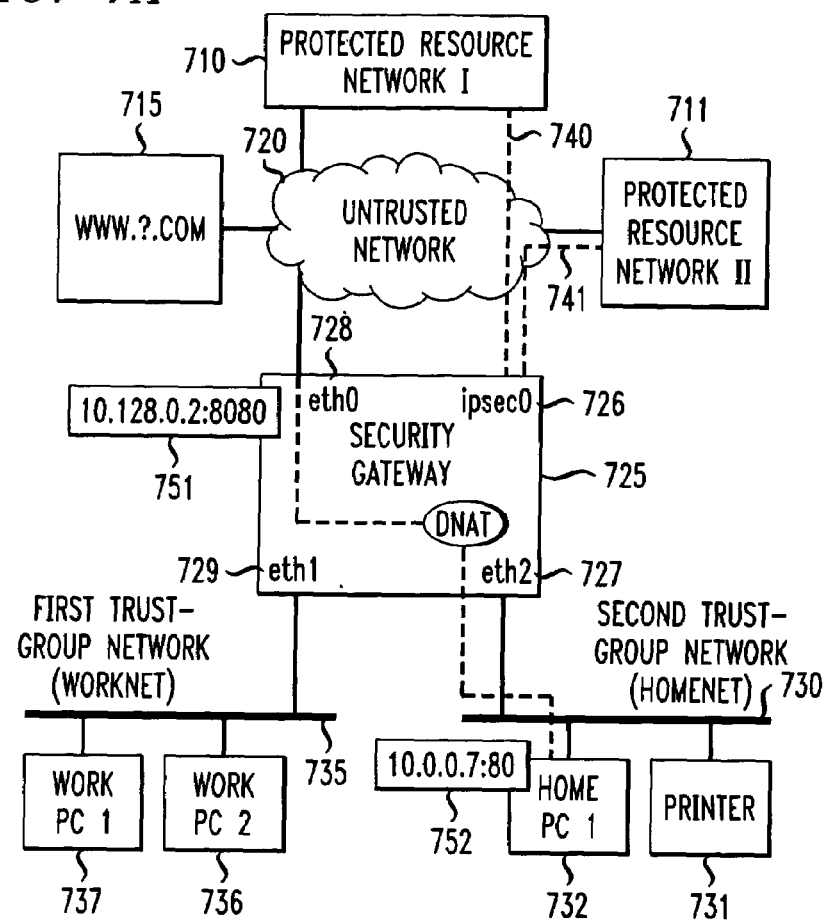
FIG. 7A is a schematic diagram of an embodiment of the invention including a first network with access to first and second protected resource networks and a second network with a web server.

An embodiment of the invention shown in the schematic diagram of FIG. 7A combines the features discussed with respect to several of the previous embodiments. A worknet network 735 and a homenet network 730 are protected by a security gateway 725 that provides connectivity to an untrusted network 720. One of the hosts 732 of the homenet network functions as an accessible server, utilizing a specific port 752 of the host 732 and a specific port 751 of the security gateway 725. Two protected resource networks 710, 711 are connected to the worknet network 735 through VPN tunnels 740, 741, permitting selected worknet hosts to communicate securely with the protected resource networks.

Figure 7B:
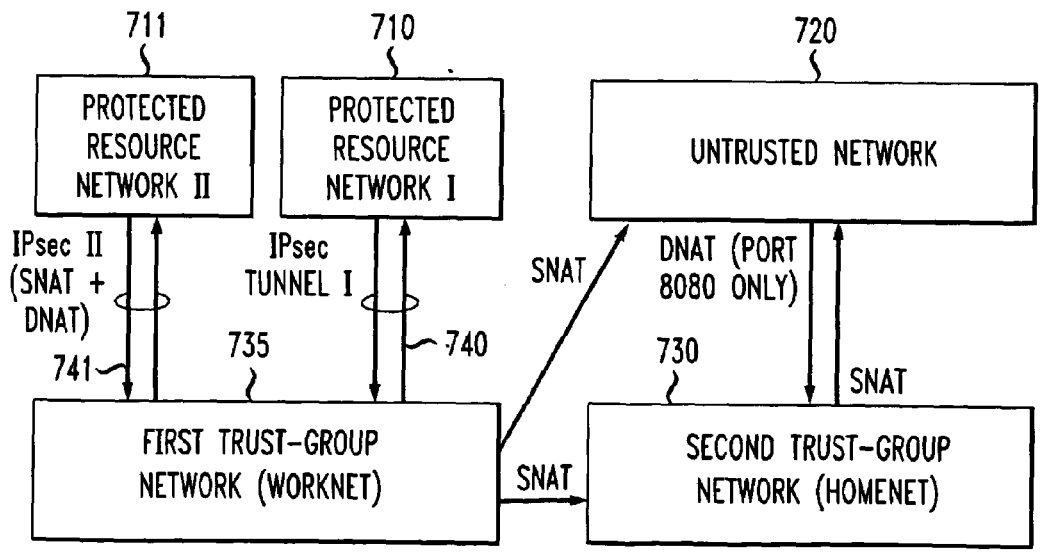
FIG. 7B is a packet flow diagram of the embodiment of FIG. 7A.

Packet routing, as shown in the schematic diagram of FIG. 7B, enforces the security measures discussed above with reference to the individual features of the various security gateway embodiments. For example, worknet 735 is permitted client access to the untrusted network 720 and to homenet 730; homenet is not permitted client access to worknet but is permitted client access to the untrusted network 720; and the untrusted network is not permitted client access to worknet and is permitted only limited client access to homenet in the form of DNATed packets addressed to a specific port in the security gateway. The security gateway uses source and destination network address translation for the second VPN IPsec tunnel 741 connection so the second protected resource network 711 will recognize a host in worknet as within its own domain.

FIGS. 7C, 7D and 7E show the rules and policies used in the worknet/homenet/accessible server/consultant embodiment of the invention. The rules added to the worknet/homenet tables of FIGS. 1C, 1D, 1E correspond directly to those rules added in the worknet/homenet/web-server tables of FIGS. 4C, 4D, 4E plus those rules added in the worknet/homenet/consultant tables shown in FIGS. 6C, 6D, 6E.

Many households today include two working spouses, each of whom at least occasionally telecommutes using a home connection to the Internet. In an embodiment of the invention shown schematically in FIG. 8A, two worknet trust-group networks 835, 850 are protected by the security gateway 825. The security gateway 825 has a single connection eth0 to an untrusted network 820 such as the Internet. The gateway 825 is connected to two protected resource networks 810, 822 (e.g., the networks of the employers of the two spouses) through two IPsec VPN tunnels 840, 841.

Figure 8A:
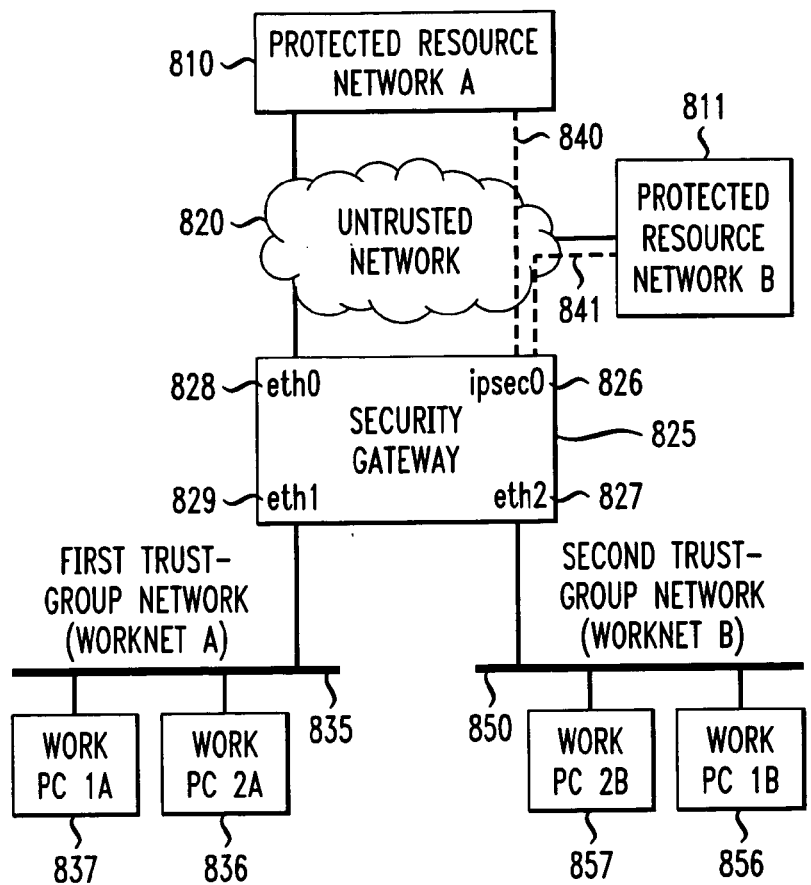
FIG. 8A is a schematic diagram of an embodiment of the invention including a first network with access to a first protected resource network and a second network with access to a second protected resource network.
Figure 8B:
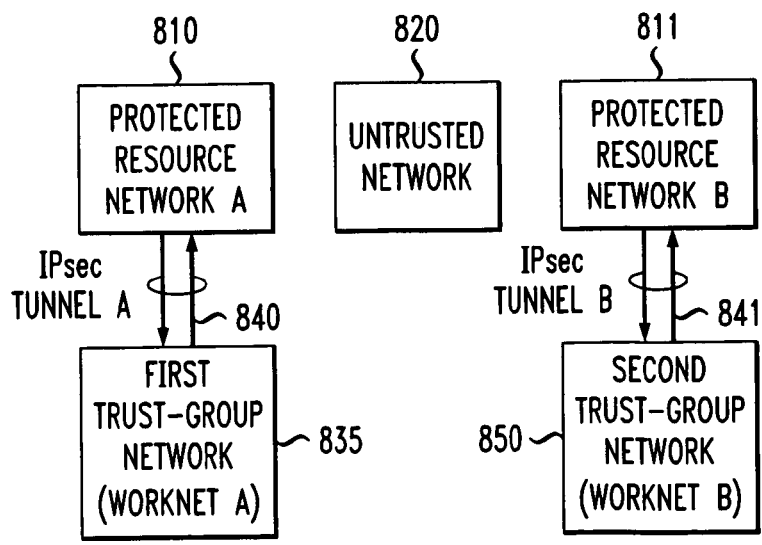
FIG. 8B is a packet flow diagram of the embodiment of FIG. 8A.

The packet flow diagram of FIG. 8B shows the client access that is permissible under the two-working-spouse embodiment of the invention. No client access is permitted to or from the untrusted network 820. Instead, in this embodiment, the untrusted network merely provides a medium for the IPsec tunnels 840, 841 connecting the protected resource networks.

Each of the IPsec tunnels 840, 841 provides mutual client access between a protected resource network and its corresponding worknet. All hosts on worknet A have IP addresses within the domain of the protected resource network A, and all hosts on worknet B have IP addresses within the domain of the protected resource network B. Furthermore, no host in either network has client access to both networks. Because of that relationship, no network address translation need be performed on any packets flowing between worknets and protected resource networks.

The embodiment of FIGS. 8A and 8B permits two (or more) independent, secure connections between home employee computers and corresponding remote corporate networks, using a single home connection to the Internet. Without the expense of a second Internet connection, each telecommuter is able to work at home without compromising the security of his or her employer's corporate network.

The pre-routing, routing and post-routing rules used to implement each remote private network/worknet combination of a two-working-spouse embodiment of the invention are analogous to those rules of FIGS. 1C, 1D and 1E that apply to packets flowing between worknet and the protected resource network. Similar sets of rules govern each of the two networks. No SNAT or DNAT rules are necessary in the pre-routing and post-routing tables, because the separate networks do not share any resources other than the common Internet connection, and no Internet client access is permitted for any network.

Figure 9A:
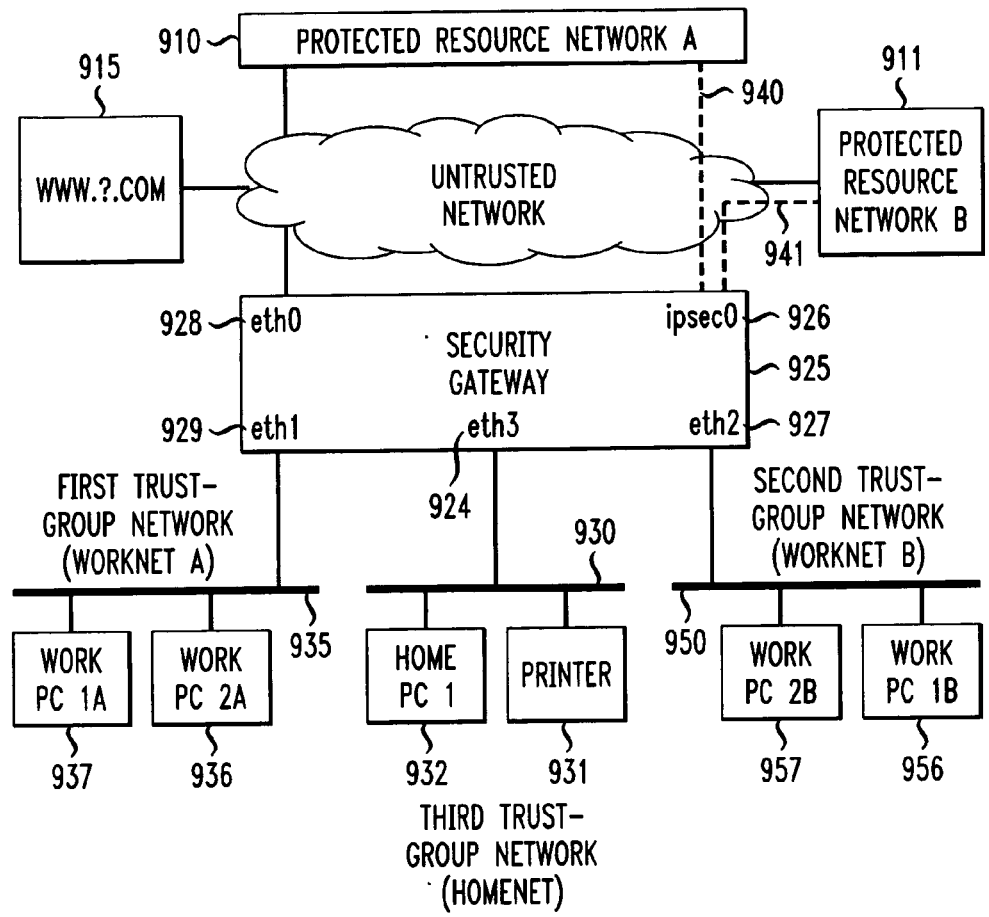
FIG. 9A is a schematic diagram of an embodiment of the invention including a first network with access to a first protected resource network, a second network with access to a second protected resource network, and a third network.
Figure 9B:
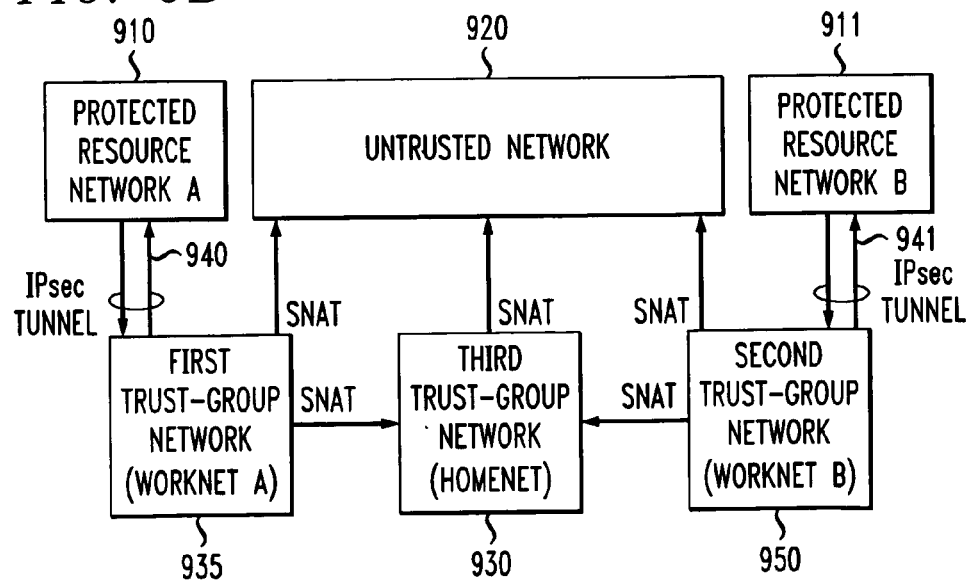
FIG. 9B is a packet flow diagram of the embodiment of FIG. 9A.

The two-working-spouse embodiment of the invention may be expanded to include Internet access and a homenet trust-group network with shared resources, as shown in FIGS. 9A and 9B. In an exemplary embodiment, the homenet network has resources such as a printer 931 that may be shared by worknets 935, 950. Also, each of the worknets and the homenet are permitted client access to the untrusted network 920. An additional Ethernet interface 924 (eth3) of the security gateway 925 connects the homenet network 930 with the security gateway 925.

The packet flow of that embodiment of the invention, as shown in FIG. 9B, includes SNATed, one-directional access from the worknets 935, 950 to both the untrusted network 920 and homenet 930. Additionally, SNATed flow is permitted from the homenet network to the untrusted network. As described above with reference to the worknet/homenet embodiment of FIGS. 1A–1E, those network address translations permit secure sharing of resources within homenet by the worknets, and permit secure access of the Internet by all networks protected by the security gateway. No destination NAT is required under this embodiment.

Figure 10:
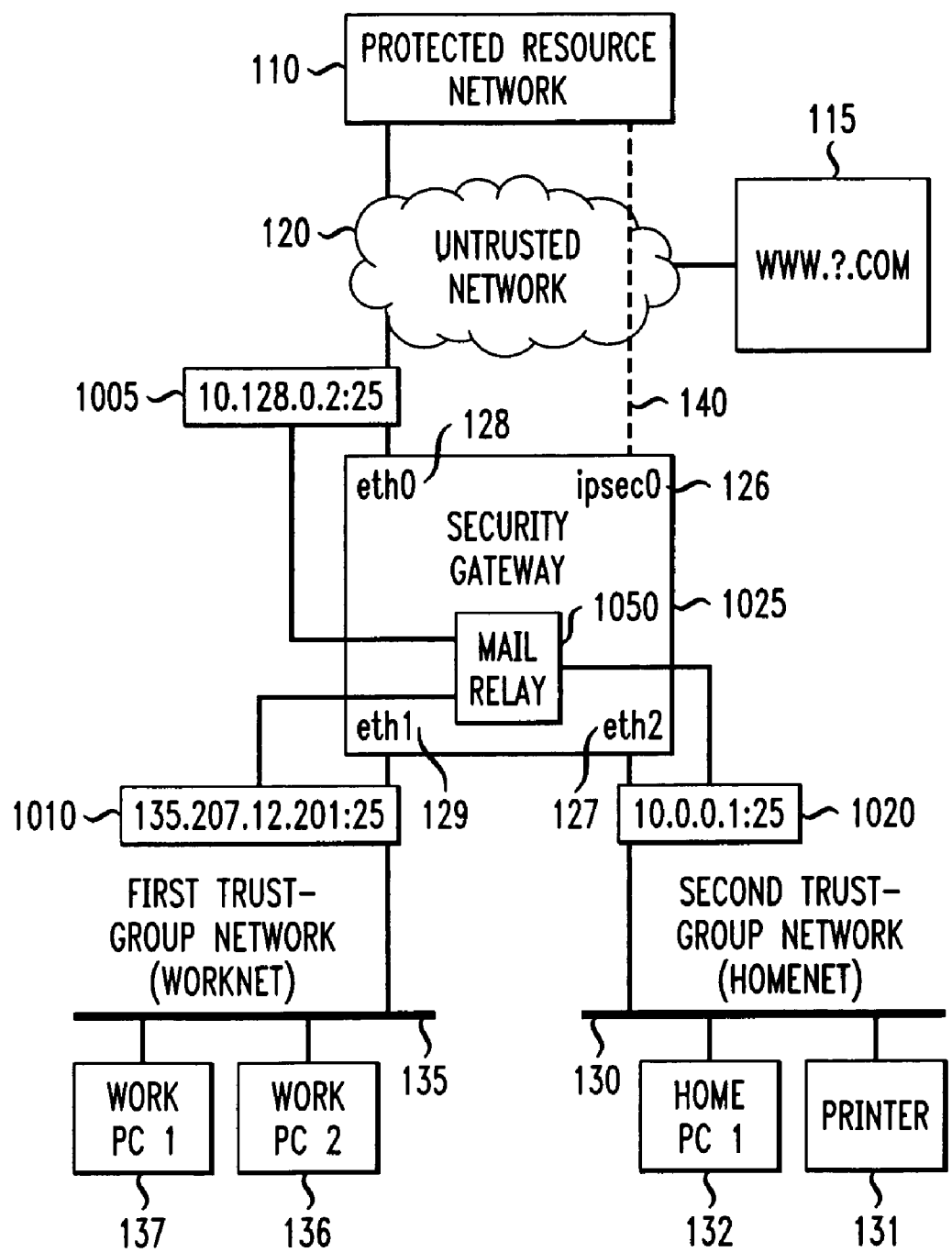
FIG. 10 is a schematic diagram of an embodiment of the invention including an outgoing mail relay and first and second networks.

As shown in FIG. 10, the security gateway 1025 of the invention may include a protected network service such as a mail relay 1050 for sending and receiving electronic mail for the networks 130, 135. The mail relay utilizes fixed network port addresses 1005, 1010, 1020 at each of the security gateway interfaces 128, 129, 127, respectively, for sending and receiving electronic mail.

The routing rules and policies depicted herein include prerouting screening rules for protecting the mail relay from unauthorized use. For example, as shown in FIG. 1C, the first two rules in rows 170 DROP all packets arriving at the untrusted network interface eth0 and the protected resource network interface ipsec0 that are addressed to the data port 25 (column 167). Those rules prevent hosts in the untrusted network 120 and in the protected resource network 110 from using the mail relay 1050, while permitting legitimate use of the mail relay by hosts in the trust-group networks 130, 135.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A security gateway comprising:
   a first logical interface to a first network;
   a second logical interface to a second network;
   a physical interface to an untrusted network through which a logical connection can be established to hosts, including hosts in a protected network; and
   a processor that is configure to
      perform source network address translation (SNAT) on packets that arrive at the first logical interface which are destined to the second network or to a host coupled to the untrusted network that is outside the protected network, and to communicate the SNAT processed packets to their respective destinations,
      refuse to establish communication to a host on the first network for a device on the second network,
      perform SNAT on packets that arrive at the second logical interface and that are destined to a host on the untrusted network that is outside the protected network, and to communicate the SNAT-processed packets to their destination, and
      send via the untrusted network, by use of an IPSec tunnel, packets that arrive at the first logical interface and that are destined to the protected network.

2. The apparatus of claim 1 where the processor is further configured to refuse to forward packets to the protected network from a host on the untrusted network or on the second network.

3. The gateway of claim 1 where the first logical interface and the second logical interface are coupled to two distinct physical connection ports of the gateway.

4. The gateway of claim 1 where the gateway is interposed between the internet and the set of the first and the second logical interfaces.

5. The gateway of claim 1 where the first network and the second network are co-located.

6. The gateway of claim 1 where the first network comprises at least one computer and the second network comprises at least one computer.

7. The gateway of claim 1 where in performing SNAT, the processor inserts into outgoing packets an IP address that belongs to the gateway.

8. The gateway of claim 1 where the processor operates pursuant to modifiable stored rules that allow at least some devices in the first network to establish a connection to hosts on the untrusted network that are outside the protected network.

9. The gateway of claim 1 where the processor is further configured to refuse to establish a connection to the first network for a host on the second network or on the untrusted network.

10. The gateway of claim 1 where the processor is further configured to decline to perform destination network address translations (DNAT) on packets destined to the first logical interface unless a connection was first established by the packets arriving to the gateway from via the first logical interface.

11. The gateway of claim 1 where the SNAT operations are performed pursuant to packet handling rules stored in the gateway.

12. The gateway of claim 11 where the packet handling rules are sensitive to identity of devices of the first network, having a capability for permitting access selected ones of the devices of the first network to gain access to a host in the untrusted network.

13. The gateway of claim 1 where the processor is further configured to permit client on the untrusted network a limited access through the gateway to a server, when addressed to a preselected network port of a preselected address of the gateway, with the gateway performing destination network address translation (DNA) of the preselected port and address to the address of the server, where the preselected port and address are selected without regard to the address of the server in to which the limited access to initiate communication is granted.

14. The gateway of claim 13 where the server is on the first network.

15. The gateway of claim 13 where the server is on the protected network, and the passage of packets from the gateway to the server is via an IPSec tunnel.

16. The gateway of claim 13 where the server is on the second network.

17. The gateway of claim 1 further comprising a logical interface to a second protected network, and the processor is configured to send packets that arrive at the first logical interface which are destined to the second protected network to their destination via the untrusted network, by use of an IPSec tunnel.

* * * * *